United States Patent
Sasaki et al.

(10) Patent No.: US 6,507,355 B2
(45) Date of Patent: *Jan. 14, 2003

(54) IMAGE RECORDING APPARATUS

(75) Inventors: Yoshiharu Sasaki, Shizuoka (JP); Koichi Kimura, Shizuoka (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,739

(22) Filed: Oct. 27, 1999

(65) Prior Publication Data

US 2001/0050707 A1 Dec. 13, 2001

(30) Foreign Application Priority Data

Oct. 27, 1998 (JP) .............................. 10-305790

(51) Int. Cl.⁷ .................................................. B41J 2/47
(52) U.S. Cl. ........................................ 347/255; 347/239
(58) Field of Search ................................ 347/239, 255, 347/135, 136

(56) References Cited

U.S. PATENT DOCUMENTS

| | | | | |
|---|---|---|---|---|
| 3,925,785 A | * | 12/1975 | Firtion et al. ................ | 347/255 |
| 4,739,415 A | * | 4/1988 | Toyono et al. ............... | 358/296 |
| RE33,931 E | * | 5/1992 | Whitney .................. | 347/239 X |
| 5,739,945 A | * | 4/1998 | Tayebati ..................... | 359/291 |
| 5,827,755 A | * | 10/1998 | Yonehara et al. ............. | 438/30 |
| 5,838,484 A | * | 11/1998 | Goossen ..................... | 359/282 |

FOREIGN PATENT DOCUMENTS

| | | | | |
|---|---|---|---|---|
| JP | 2-254472 | 10/1990 | .......... | G03G/15/04 |
| JP | 4-303817 | 10/1992 | ........... | G02F/1/055 |
| JP | 4-306620 | 10/1992 | ......... | G02F/1/1345 |
| JP | 9-216417 | 8/1997 | ............ | B41J/2/445 |

OTHER PUBLICATIONS

Anthamatten, O.; Battig, R.K.; Valk, B.; Vogel, P.; Marxer, C.; Gretillat, M., "Packaging of a reflective optical duplexer based on silicon micromechanics", Advanced Applications of Lasers in Materials Processing/Broadband Optical Networks.*
/Smart Pixels/Optical MEMs and Their Applications. IEEE/LEOS 1996 Summer Topical Meetings:, 1996, pp. 61–62.*
Aratani, K.; French, P.J.; Sarro, P.M.; Wolffenbuttel, R.F.; Middelhoek, S., "Process and design considerations for surface micromachined beams for a tuneable interferometer array in silicon Micro Electro Mechanical Systems", 1993, MEMS '93.*
Proceedings An Investigation of Micro Structures, Sensors, Actuators, Machines and Systems. IEEE., 1993 pp. 230–235.*
Battig, R.K.; Anthamatten, O.; Valk, B., "A reflective modulator based on silicon micromechanics", "Optical and Hybrid Access Networks", IEE Colloquium on, 1996, pp. 10/1–10/4.*

* cited by examiner

Primary Examiner—Hai Pham
(74) Attorney, Agent, or Firm—Sughrue Mion, PLLC

(57) ABSTRACT

A laser beam emitted from a high output semiconductor laser 101 is irradiated into an interference type optical shutter 105 by a first optical system 103 as a wide laser beam along a predetermined direction which intersects with an emitted direction of the laser beam, and also a voltage which mates with the images to be recorded on the recording medium 3 is selectively applied to the electrode pairs of the interference type optical shutter 105, thus the laser beam being input into the interference type optical shutter 105 is optically modulated by an electro-mechanical operation of a flexible thin film to thus irradiate onto the recording medium 3 via a second optical system 107. Accordingly, the image recording apparatus with high reliability, which is able to record the image on the recording medium in the heat mode at high speed by using the high power laser, can be provided.

12 Claims, 16 Drawing Sheets

1. WIND AN IMAGE RECEIVING SHEET ROUND A DRUM

2. WIND A TONER SHEET

3. LAMINATE PROCESS

4. LASER RECORDING BY K DATA

5. LASER LIGHT
6. K PEELING
7. WIND A C TONER SHEET
8. LASER RECORDING BY C DATA
9. C PEELING
10. WIND AN M TONER SHEET
11. LASER RECORDING BY M DATA
12. M PEELING
13. WIND A Y TONER SHEET
14. LASER RECORDING BY Y DATA
15. Y PEELING

4 × 4 EQUAL PITCH

○ IRRADIATION POINT

× VIRTUAL POINT $$\tan \theta = \frac{1}{n}$$

ALL CHANNELS USED

⇐ ONE ROW NOT USED $$\tan \theta = \frac{1}{n-1}$$

TWO ROWS NOT USED $$\tan\theta = \frac{1}{n-2}$$

MAIN AND SUB DIFFERENT PICTCHES
IN 5 ROWS AND 4 COLUMNS $$\tan\theta = \frac{Ph}{n \cdot Pv}$$

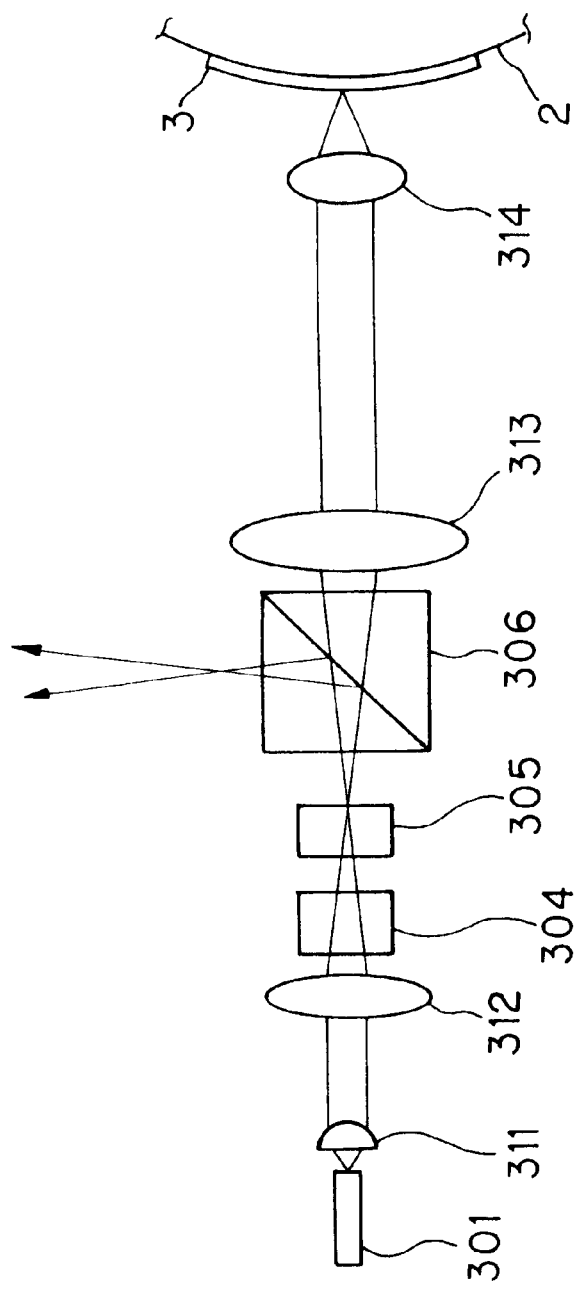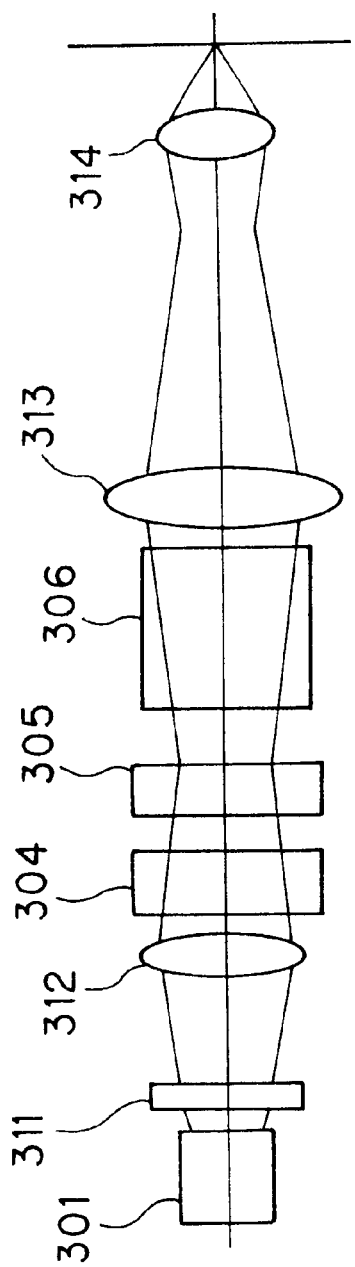
FIG. 25(a) PRIOR ART
FIG. 25(b) PRIOR ART

IMAGE RECORDING APPARATUS

BACKGROUND OF THE INVENTION

1. Field of the Invention

The present invention relates to an image recording apparatus for recording images, characters, etc. onto a recording medium by using a recording laser head and, more particularly, an image recording apparatus with high reliability, which can execute a high-speed image recording onto a recording medium in a heat mode with the use of an interference type optical shutter which can withstand a high power laser light.

2. Description of the Prior Art

In the image recording apparatus for recording the images onto the recording medium, improvement in the image recording speed is always requested. In particular, in the image recording apparatus for recording the images in unit of pixel (dot) by scanning an optical spot onto the recording medium such as photosensitive material, etc., it is effective in improving the recording speed to record a plurality of dots simultaneously by irradiating a plurality of optical spots simultaneously to the recording medium.

In unexamined Patent Application Publication (JPA) Hei 2-254472, the fixedly scanning type print head has been proposed in connection with such image recording apparatus.

In Patent Application Publication (KOKAI) Hei 4-303817, Patent Application Publication (KOKAI) Hei 4-306620, etc., the optical head which can expose and record a plurality of dots simultaneously has been proposed. More particularly, the optical device (so-called optical shutter array) which has a plurality of prismatic shutter portions made of PLZT and arranged at a predetermined interval along a predetermined direction is provided, then the laser beam emitted from one or more laser light sources is shaped into the wide laser beam along the predetermined direction by the optical system, which is arranged between the laser light source and the optical shutter array, then the polarizing direction of the laser beam transmitted from the shutter portions is changed selectively by the optical shutter array, which is arranged at the beam waist position of the laser beam, then only the laser beam which is transmitted through respective shutter portions of the optical shutter array and has the predetermined polarizing direction can be irradiated onto the recording medium.

In addition, in Patent Application Publication (KOKAI) Hei 9-216417, the optical device which can control the polarization of the incident laser beam in response to the recorded images such that the energy of the incident laser beam can be utilized effectively in recording the image and which has low probability of the failure has been proposed. This optical device is constructed to comprise the light transmitting portion which is made of electro-optical material such as PLZT, etc. and whose length along the traveling direction of the incident laser beam is set constant and which has the successive shape along the predetermined direction intersecting with the incident laser beam, and a plurality of electrode pairs arranged on both sides of the optical transmitting portion to put the optical path of the incident laser beam between them and arranged at a predetermined interval along the predetermined direction.

A configuration of an optical system of an optical head employing the optical device (PLZT device) as the optical shutter is shown in FIGS. 25A and 25B. The optical system of the optical head is constructed to comprise a semiconductor laser 301, a first lens (cylindrical lens) 311, a second lens 312, a first polarizing device 304, an optical device (PLZT device) 305, a second polarizing device 306, a third lens 313, and a fourth lens 314.

A first optical system consisting of the first lens 311, the second lens 312, and the first polarizing device 304 transmits the laser beam, which is emitted from the semiconductor laser 301, into a light transmitting portion consisting of the optical device 305 as a luminous flux which is formed wide along the predetermined direction. Then, the voltage is applied selectively to a plurality of electrode pairs of the optical device 305 by a controlling means (not shown) so as to form the image which is to be recorded on the recording medium 3 (recording member on a drum 2). Accordingly, the polarization of the incident laser beam is controlled in response to the recorded image every luminous flux, which is transmitted via a different portion on the light transmitting portion of the optical device 305, so that the polarization direction is rotated by 45° or 135°. Then, most of the laser beam having the polarization direction of 45° is removed from the laser beam transmitted through the optical device 305 by the second polarization device 306. Then, the recording laser beam having the polarization direction of 135° is irradiated onto the recording medium 3 via the first optical system consisting of the third lens 313 and the fourth lens 314.

In this while, in the image recording apparatus in the prior art, the normal power semiconductor laser is employed as the light source. The image can be recorded sufficiently practically by the normal power semiconductor laser onto the fast recording medium (photo mode), e.g., photographic film, printing lith film (the silver salt is employed as photosensitive material), etc. However, since the sensitivity is lowered by three to five digits in the transfer type recording medium (heat mode), the irradiation of the laser beam (exposure) is needed for a long time if the normal power semiconductor laser is employed. Therefore, there is the circumstance that, since a processing time from several thousand times to several hundred thousand times must be consumed in the heat mode, the normal power semiconductor laser is not practical.

For this reason, the recording medium of the heat mode is employed, it is desired to use the high output semiconductor laser as the light source. In this case, in the configuration in which the optical device (PLZT device) or the liquid crystal optical shutter (FLC) is used as the optical shutter like the image recording apparatus in the prior art, the power-tolerance property is required for the optical shutter to withstand the high power laser beam. However, even if the liquid crystal or the PLZT device absorbs merely several % of the optical energy emitted from the high output semiconductor laser, the temperature of the liquid crystal or the PLZT device is excessively increased to thus depart from the rated operating temperature. As a result, there is the circumstance that a possibility of the failure of the system is caused.

SUMMARY OF THE INVENTION

The present invention has been made in view of the above circumstance in the prior art, and it is an object of the present invention to provide an image recording apparatus with high reliability, which can execute a high-speed image recording onto a recording medium in a heat mode with the use of an interference type optical shutter which can withstand a high power laser light.

In order to overcome the above subject, an image recording apparatus set forth in a first aspect of the present invention, for recording images on a recording medium by modulating a light emitted from a light source by an optical modulation device, wherein the light source comprises a high power laser, and the optical modulator device is comprises a transmission type optical modulator device which optically modulates the light emitted from the light source by an optical interference effect based on an electromechanical operation of a flexible thin film.

In this image recording apparatus, since the transmission type optical modulation device (interference type optical shutter) in which the irradiation light from the high power laser is optically modulated by the electromechanical operation of the optical modulation device is employed, absorption of the incident light can be reduced extremely and also the high output-tolerance property against the high power laser can be enhanced rather than the configuration using the optical device and the crystal liquid shutter in the prior art. In addition, the image can be recorded onto the recording medium in the heat mode at high speed.

In an image recording apparatus of a second aspect, the optical modulator device comprises one electrode, other electrode facing to one electrode to put a clearance between them, and a flexible thin film connected to any one of one electrode and other electrode, and deflects the flexible thin film by a coulomb force, which is generated by applying a voltage between one electrode and other electrode, to then modulate the light transmitted through the flexible thin film by an optical multi-layer film interference effect.

In this image recording apparatus, the light transmitted through the flexible thin film can be optically modulated by deflecting the flexible thin film, which is connected to any one of one electrode and the other electrode, by virtue of the coulomb force, which is generated by applying the voltage between one electrode and the other electrode. In other words, in this optical modulator device, the light intensity transmittance can be suppressed low since the flexible thin film is not deformed when the voltage is not applied between the electrodes, while the light intensity transmittance can be increased since the flexible thin film is deformed when the voltage is applied between the electrodes. As a result, the optical modulation can be achieved.

In this case, by using the optical modulator device formed as a laminated structure, for example, the interference type optical shutter utilizing the Fabry-Perot interference, the image recording apparatus with high reliability can be implemented, which can be operated by the lower voltage to have the excellent high-speed responsibility without the problem of heat generation due to the light absorption, and can be formed as the integrated circuit on the semiconductor substrate.

In an image recording apparatus of a third aspect, the optical modulator device is arranged to be inclined relative to a surface, which intersects orthogonally with an incident optical axis from the light source, by a predetermined angle.

In this image recording apparatus, the return light from the optical modulator device can be prevented from entering into the light source by tilting the optical modulator device relative to the surface being intersecting orthogonally with the incident optical axis from the light source by the predetermined angle such that the return light from the optical modulator device is not input into a part or all of the incident light paths. As a result, the output of the light source can be maintained normally.

In an image recording apparatus of a fourth aspect, a shielding plate is interposed in a middle of an optical path of a return light from the optical modulator device such that the return light is prevented from entering into the light source by the shielding plate.

In this image recording apparatus, incidence of the return light from the optical modulator device to the light source can be prevented without fail and also reduction in the optical modulation efficiency can be suppressed since the inclined angle of the optical modulator device can be reduced smaller.

In an image recording apparatus. of a fifth aspect, a polarizing beam splitter and a wavelength plate are provided between the light source and the optical modulator device, polarization directions of an incident light and a return light are changed differently respectively, and thus only the return light is removed from an incident optical axis by the polarizing beam splitter.

In this image recording apparatus, when the incident light from the light source transmits through the polarizing beam splitter and the wavelength plate to output to the optical modulator device, such incident light is circularly polarized (45° polarized) by the wavelength plate to then irradiate to the optical modulator device. Then, because the return light from the optical modulator device transmits the wavelength plate again, such return light is circularly polarized (45° polarized), so that the polarization direction of the return light is changed by 90° from the incident light. When such polarized return light is introduced into the polarizing beam splitter, only the return light is departed from the incident optical axis. In other words, the polarization direction of the return light is changed when the return light transmits through the wavelength plate, so that such return light can be removed from the incident optical axis direction by the polarizing beam splitter because of the change of this polarization direction.

In an image recording apparatus of a sixth aspect, the light source is a broad area laser light source, and the optical modulation device is formed as an optical modulation device array in which a plurality of optical modulator elements are aligned in a one-dimensional fashion.

In this image recording apparatus, multiple spots can be formed by using the broad area laser light source as the light source and also the number of spots which can be irradiated at a time can be increased extremely by using the optical modulation array device in which the optical modulation elements are aligned in a predetermined direction. Therefore, the recording time can be reduced while increasing the recording density.

In an image recording apparatus of a seventh aspect, an alignment direction of the optical modulator elements coincides substantially with a direction which intersects orthogonally with main scanning direction.

In this image recording apparatus, in the recording system wherein the reflected light from the optical modulation device is irradiated to the recording rotating drum while scanning the optical head, in which the light source and the optical modulation device are formed integrally, along the axis direction of the recording rotating drum, a plurality of spots can be formed by using the broad area laser light source in the axis direction (sub scanning direction) of the recording rotating drum, so that the recording speed can be enhanced. In addition, in the recording system wherein the reflected light from the optical modulation device is irradiated on to the recording medium while scanning via the polygon mirror, a plurality of spots can be formed by using the broad area laser light source in the carrying direction (sub scanning direction) of the recording medium, so that the recording speed can be enhanced.

In an image recording of an eighth aspect, the optical modulation device array is arranged to have a direction which is rotated around a normal of a surface of the device by a predetermined angle.

In this image recording apparatus, the distances between the irradiation points by the optical modulator device in the width direction of the recording medium can be substantially narrowed. As a result, the fine linear images with excellent linearity can be achieved.

In an image recording apparatus of a ninth aspect, wherein the optical modulator device is an optical modulator array device whose elements are aligned in a two-dimensional matrix, and the rotation angle $\theta$ can be given by $\tan \theta = Ph/(n \times Pv)$ where n is number of rows in a main scanning direction of irradiation points which correspond to optical modulator elements, Ph is a pitch in the main scanning direction, and Pv is a pitch in a sub scanning direction.

In this image recording apparatus, even if alignment pitches of elements of the optical modulation array device are different in the main scanning direction and the sub scanning direction, the rotation angle can be precisely defined.

In an image recording apparatus of a tenth aspect, wherein the optical modulator device is arranged to be inclined relative to a surface, which intersects orthogonally with an incident optical axis from the light source by an angle so as to prevent the return light from the optical modulator device from reaching to the light source.

In this image recording apparatus, incidence of the return light from the optical modulator device to the light source can be prevented without fail and also reduction in the optical modulation efficiency can be suppressed since the inclined angle of the optical modulator device can be reduced smaller.

BRIEF DESCRIPTION OF THE DRAWINGS

FIGS. 25A and 25B are views showing an optical system of an optical head in the image recording apparatus, in which an optical device (PLZT device) is employed as the optical shutter, in the prior art respectively.

DETAILED DESCRIPTION OF THE PREFERRED EMBODIMENTS

Image recording apparatuses according to embodiments of the present invention will be explained in detail with reference to the accompanying drawings hereinafter.

Figure 1:
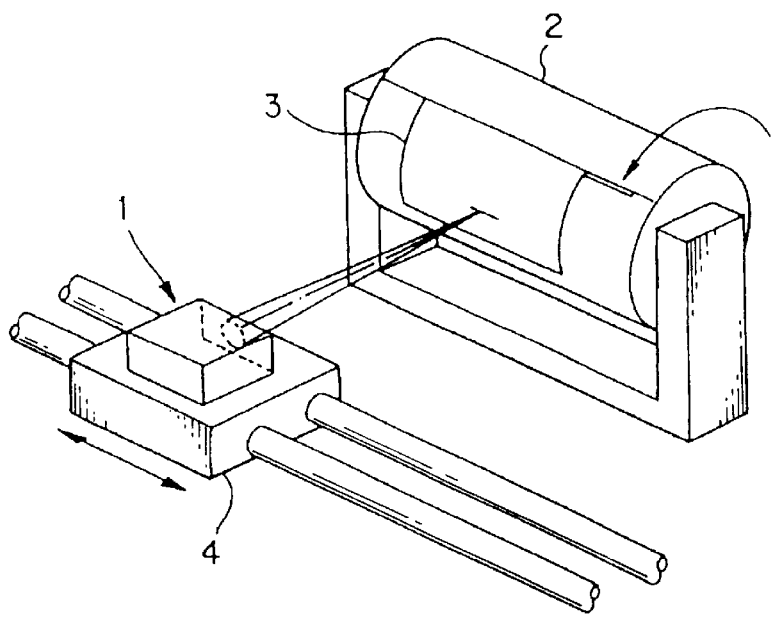
FIG. 1 is a perspective view showing a pertinent configuration of an image recording apparatus according to a first embodiment of the present invention.

FIG. 1 is a perspective view showing a pertinent configuration of an image recording apparatus according to a first embodiment of the present invention. The image recording apparatus according to the first embodiment comprises an optical head 1 which has a plurality of laser beams, and a recording rotating drum 2 which has a recording medium 3 on its external peripheral surface and is supported rotatably is shown in FIG. 1. The optical head 1 ON/OFF-modulates respective laser beams according to recording data, and is moved in parallel with a rotation axis. The optical head 1 is set on a moving stage 4 which can be moved in parallel with the recording rotating drum 2. This movement corresponds to the sub scanning direction in forming the image. In contrast, the rotation direction of the recording rotating drum 2 corresponds to the main scanning direction. In this case, in place of the optical head 1, the recording rotating drum 2 may be moved along the sub scanning direction. In other words, the optical head 1 and the recording rotating drum 2 may be relatively moved along the drum axis direction to achieve the sub scanning movement.

Figure 2:
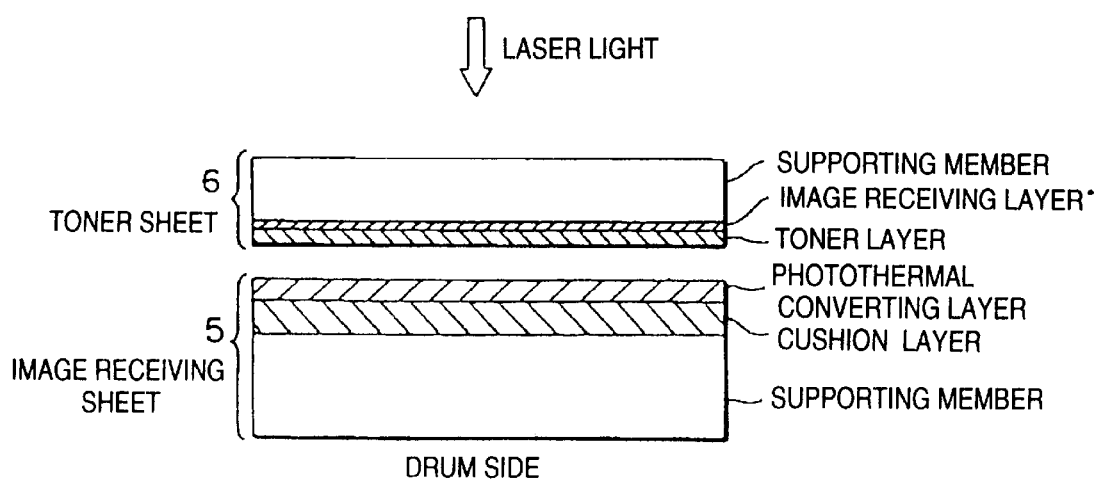
FIG. 2 is a view showing a configuration of a recording medium employed in the image recording apparatus.

FIG. 2 is a view showing a configuration of an image receiving sheet 5 and a toner sheet 6, which serve as the recording medium 3 employed in the image recording apparatus according to the first embodiment. The image receiving sheet 5 comprises a supporting member, a cushion layer, and an image receiving layer in sequence from the recording rotating drum 2 side The toner sheet 6 comprises a supporting member, a photothermal converting layer, and a toner layer in sequence from the laser light irradiation side. The image receiving sheet 5 is mounted on the recording rotating drum 2. The toner sheet 6 is stacked on the image receiving sheet 5 to direct the toner layer to the image receiving sheet 5 side. When the laser beam is irradiated onto the toner sheet 6 from the opposite side of the image receiving sheet 5 side, the irradiated portion of the toner layer is transferred on the image receiving layer by the heat.

The material which can transmit the laser beam, e.g., PET (polyethylene terephthalate) base, TAC (triacetylcellulose) base, PEN (polyethylene naphthalate) base, etc. may be employed as the supporting member. Also, the material which can convert the laser energy into the heat effectively, e.g., carbon black, infrared absorbing dye, specific wavelength absorbing substance, etc. may be employed as the photothermal converting layer. Respective KCMY toner sheets may be employed as the toner layer. Also, in some cases toner sheets of gold, silver, lightbrown, gray, orange, green, etc. may be employed. The image receiving layer acts to receive the transferred toner. In addition, the cushion layer acts to absorb the difference in level when the toners are stacked in plural stages and the difference in level caused due to the dust.

In this event, more detailed contents of the image receiving sheet 5 and the toner sheet 6, which serve as the recording medium 3 employed in the image recording apparatus according to the first embodiment, are set forth in unexamined Patent Application Publication (KOKAI) Hei 4-296594, unexamined Patent Application Publication (KOKAI) Hei 4-327982, unexamined Patent Application Publication (KOKAI) Hei 4-327983, etc. filed by the applicant of this application and also the image recording apparatus employing such recording medium has been described in detail in unexamined Patent Application Publication (KOKAI) Hei 6-275183. Therefore, please see the above if necessary.

Figure 3:
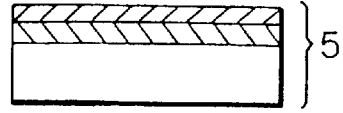
FIG. 3 is views showing an actual example of recording steps of KCMY colors respectively.
Figure 3:
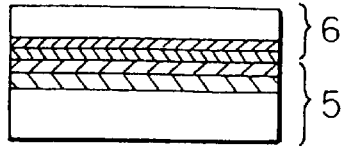
Figure 3:
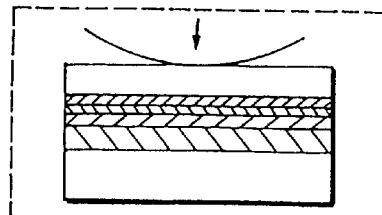
Figure 3:
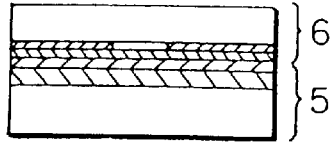
Figure 3:
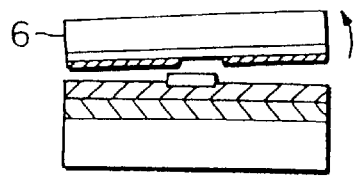
Figure 3:
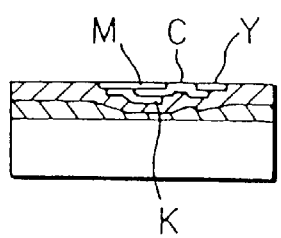

Then, FIG. 3 is views showing an actual example of recording steps of KCMY colors respectively. Steps of recording four colors of KCMY comprise the step of performing the laser recording by each color data, and the step of peeling the toner sheet from the image receiving sheet after recording respectively. In this case, if the laminate process is carried out, such laminate process is executed prior to the laser recording step. Respective steps will be explained sequentially hereinbelow.

1) Wind the image receiving sheet 5 round the recording rotating drum 2.
2) First, wind the K toner sheet 6 onto the image receiving sheet 5 to execute the K step.
3) Irradiate the laser light to record K image/character data.
4) Then, peel off the K toner sheet 6 from the image receiving sheet 5 (end of the K step).
5) Then, execute the C step. That is, wind a C toner sheet onto the image receiving sheet.
6) Execute the laser recording by C data.
7) Finally, peel off the C toner sheet from the image receiving sheet (end of the C step).
8) Then, execute the M step. That is, wind an M toner sheet onto the image receiving sheet.
9) Execute the laser recording by M data.
10) Peel off the M toner sheet from the image receiving sheet (end of the M step).
11) Then, execute the Y step. That is, wind a Y toner sheet onto the image receiving sheet.
12) Execute the laser recording by Y data.
13) Finally, peel off the Y toner sheet from the image receiving sheet (end of the Y step).
14) In this manner, four colors of KCMY are appropriately laminated or not laminated on the image receiving sheet, and thus necessary color image can be achieved.
15) Transfer the color image onto the sheet.

In this case, if the laminate process is carried out, the toner sheet can be tightly contacted with the image receiving sheet by pushing the toner sheet by virtue of a pressurizing roller, a heating roller, etc. every color immediately before the laser recording.

In the above recording step, it is desired that the recording speed is set in the range of 0.5 to 50 [m/s], preferably the range of 1 to 16 [m/s]. The above mentioned are basic operations of the image recording apparatus.

Figure 4:
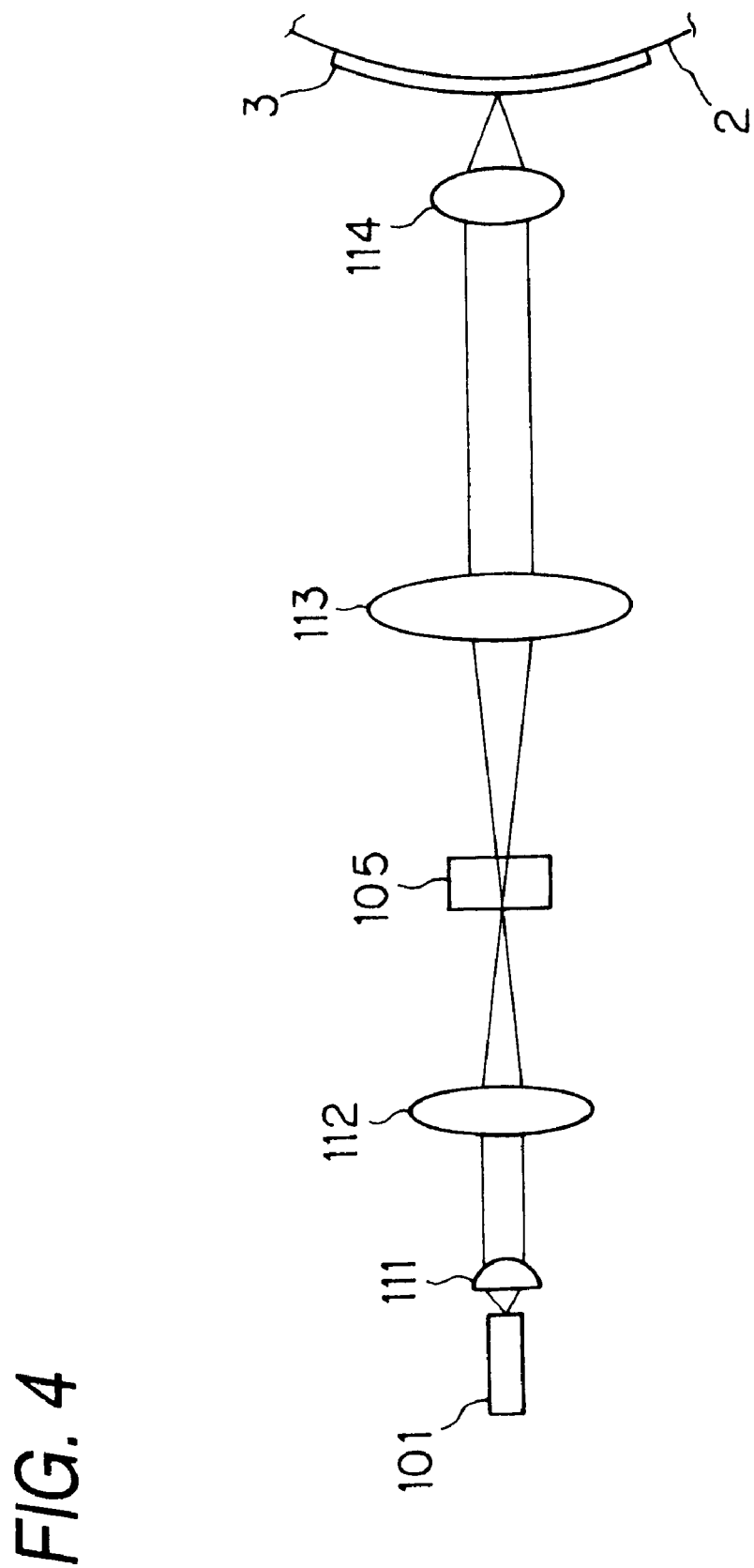
FIG. 4 is a view showing a configuration of an optical system of an optical head in the image recording apparatus using an interference optical shutter, according to the first embodiment of the present invention.

Next, a configuration of the optical head 1 will be explained hereunder. FIG. 4 is a view showing a configuration of an optical system of an optical head in the image recording apparatus using an interference optical shutter, according to the first embodiment of the present invention. In FIG. 4, the optical system of an optical head in the image recording apparatus according to the first embodiment comprises a semiconductor laser 101, a first lens 111 (cylindrical lens), a second lens 112, a interference type optical shutter 105, a third lens 113, and a fourth lens 114. The first lens 111 and the second lens 112 constitute a first optical system 103, while the third lens 113 and the fourth lens 114 constitute a second optical system 107.

First, the recording semiconductor laser 101 corresponding to the light source of the present invention may be constituted by a single spot laser, but a so-called broad area laser which is constructed by arranging linearly about 20 light emitting blocks, each has a light emitting surface of 1×200 $\mu$m, for example, in total at a pitch of 400 $\mu$m may be applied in the first embodiment. Accordingly, the laser beams emitted from respective light emitting blocks are overlapped with each other to thus reduce variation in light quantity, so that the luminous flux having a uniform distribution of the light quantity can be yielded.

A plurality of laser beams are emitted from the semiconductor laser 101 along the alignment direction of the light emitting surfaces. Here, any wavelength of the laser beam may be used if it can mate with the wavelength sensitivity characteristic of the recording medium 3. For example, the wavelength of the laser light can be set to 830 [nm]. The power of the laser beam is set differently based on the sensitivity of the recording medium 3 or the image recording time of the image recording apparatus. In the first embodiment, the semiconductor laser 101 which is able to output the high power laser beam is assumed such that it may be applied even if the recording medium 3 of the heat mode is used. Therefore, the high output multimode LD whose output is in excess of 2 W (10 W, 20 W, 40 W), for example, is desirable as the semiconductor laser 101.

The first lens 111 (cylindrical lens) is arranged on the laser beam output side of the semiconductor laser 101. The first lens 111 is placed at a position, which is away from the light emitting surface of the semiconductor laser 101 by the focal length of the first lens 111, such that the direction of the lens power intersects orthogonally with the alignment direction of a plurality of laser beams emitted from the semiconductor laser 101. For convenience of explanation, in the following, the alignment direction of a plurality of laser beams emitted from the semiconductor laser 101 (the direction vertical to this sheet in FIG. 4) is called the lateral direction, and the direction intersecting orthogonally with the alignment direction is called the vertical direction. A plurality of laser beams being emitted from the semiconductor laser 101 into the first lens 111 are shaped from divergent lights into parallel lights only along the vertical direction respectively.

The second lens 112 which has a rotationally symmetric shape having the positive lens power is arranged on the laser beam emit side of the first lens 111. The second lens 112 is arranged at the position which is separated from the light emitting surface of the semiconductor laser 101 by the focal length of the second lens 112. A plurality of laser beams emitted from the first lens 111 into the second lens 112 are shaped by the second lens 112 from the parallel beam to the convergent beam in the vertical direction and also shaped by the second lens 112 from the divergent beam to the parallel beam in the lateral direction. Thus, the wide laser beams can be obtained near the focal position of the second lens 112 in the lateral direction, and also their optical axes of the laser beams coincide with each other at the focal position of the second lens 112.

Then, the interference type optical shutter 105 which corresponds to the optical modulator device of the present invention is arranged on the laser beam output side of the second lens 112. A configuration of operational principle of the interference type optical shutter 105 will be explained later.

Next, the second optical system 107 will be explained hereunder. In FIG. 4, the third lens 113 which has a rotationally symmetric shape having the positive lens power is arranged on the laser beam output side of the interference type optical shutter 105. The third lens 113 is arranged at the position which is separated from the second lens 112 by a distance corresponding to the sum of the focal length of the second lens 112 and the focal length of the third lens 113. After transmitted through the interference type optical shutter 105 into the third lens 113, the laser beam is shaped by the third lens 113 from the divergent beam into the parallel beam in the vertical direction and also shaped by the third lens 113 from the parallel beam to the convergent beam in the lateral direction.

Also, the fourth lens 114 which has a rotationally symmetric shape having the positive lens power is arranged on the laser beam output side of the third lens 113. The fourth lens 114 is arranged at the position which is separated from the third lens 113 by a distance corresponding to the sum of the focal length of the third lens 113 and the focal length of the fourth lens 114. After transmitted through the third lens 113 into the fourth lens 114, the laser beam is shaped by the fourth lens 114 from the parallel beam into the convergent beam in the vertical direction and also shaped by the fourth lens 114 from the divergent beam into the parallel beam in the lateral direction.

Moreover, the laser beam being output from the fourth lens 114 is emitted to the outside of a housing via an opening portion (not shown) provided in the housing of the optical head 1. Then, the recording medium 3 which is held on the external peripheral surface of the recording rotating drum 2 is arranged at a position corresponding to the focal position of the fourth lens 114. Then, the laser beam is output from the fourth lens 114 to the outside of the housing of the optical head 1 and then irradiated onto the recording rotating drum 2.

Figure 5:
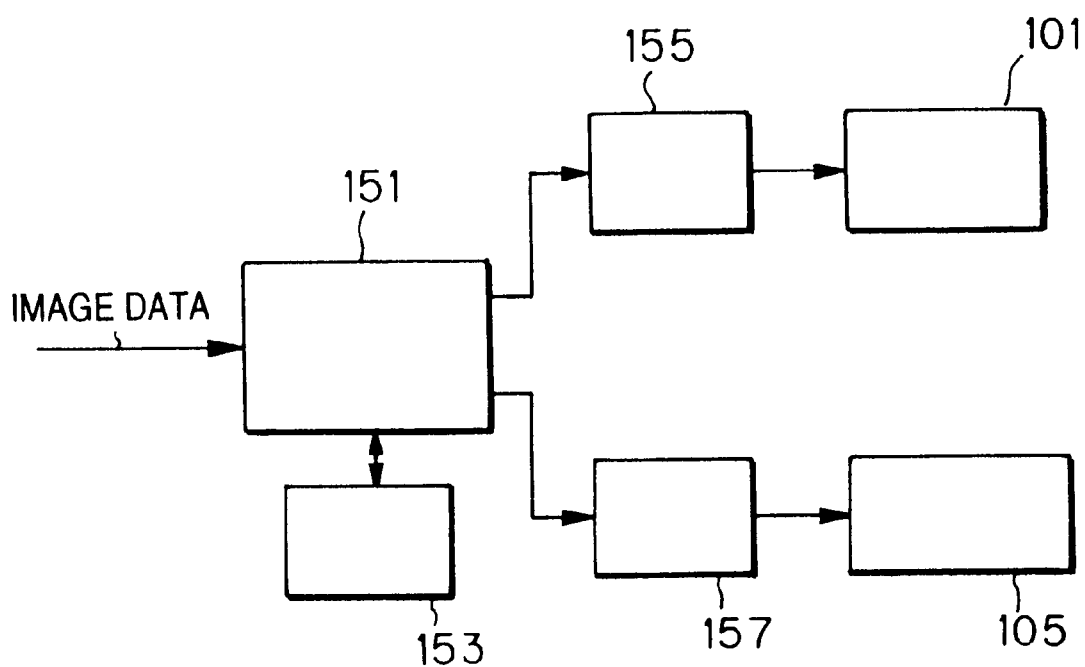
FIG. 5 is a view showing a schematic configuration of peripheral circuits of a controller.

FIG. 5 is a view showing a schematic configuration of peripheral circuits of the controller. As shown in FIG. 5, the semiconductor laser 101 is connected to a controller 151 via a driver 155, and the interference type optical shutter 105 is also connected to a controller 151 via a driver 157. A signal line for inputting the image data from the external device is connected to the controller 151. Thus, the image data representing the image to be recorded onto the recording medium 3 are input from the external device via the signal line. Also, a frame memory 153 for storing the image data is connected to the controller 151. In addition, a driving portion for rotating the recording rotating drum 2 and a driving portion for moving the moving stage 4 (and the optical head 1) are connected to the controller 151 respectively.

Next, the interference type optical shutter 105 employed in the first embodiment will be explained in detail hereunder. In the first embodiment, as the optical modulator device which has transparent flexible thin films interposed between the electrode pairs and then optically modulates the laser beam transmitted from the first optical system 103 (second lens 112) by the electro-mechanical operation of the flexible thin films to output, the interference type optical shutter 105 which utilizes the Fabry-Perot interference (Fabry-Perot interference type optical modulator device driven by the micromachine) is employed.

According to the Fabry-Perot interference, under the condition that two sheets of flat plans are arranged to face to each other, the incident light is split into a number of parallel lights after reflection and transmission are repeated. The transmitted lights are superposed at an infinity to interfere. If an angle between a perpendicular of the surface and the incident light is assumed as $\theta i$, the optical path difference x between the neighboring two beams can be given by $x = nt \cdot \cos \theta i$. Where n is a refractive index between two surfaces, and t is an interval between two surfaces. The transmitted laser beams are enhanced mutually if the optical path difference x is an integral multiple of the wavelength $\lambda$, while they are canceled mutually if the optical path difference x is an odd number multiple of the wavelength $\lambda$. In other words, unless the change in phase is not caused in reflection of the beam, the intensity of the transmitted laser beam is increased up to the maximum at $2nt \cdot \cos \theta i = m\lambda$, and the intensity of the transmitted laser beam is reduced to the minimum at $2nt \cdot \cos \theta i = (2m+1) \lambda/2$. Where m is a positive integral number.

More particularly, the laser beam being output between the signal electrodes can be optically modulated by moving the flexible thin films such that the optical path difference x can be set to a desired value, so that the modulated beam can be output from the flexible thin films.

Figure 6:
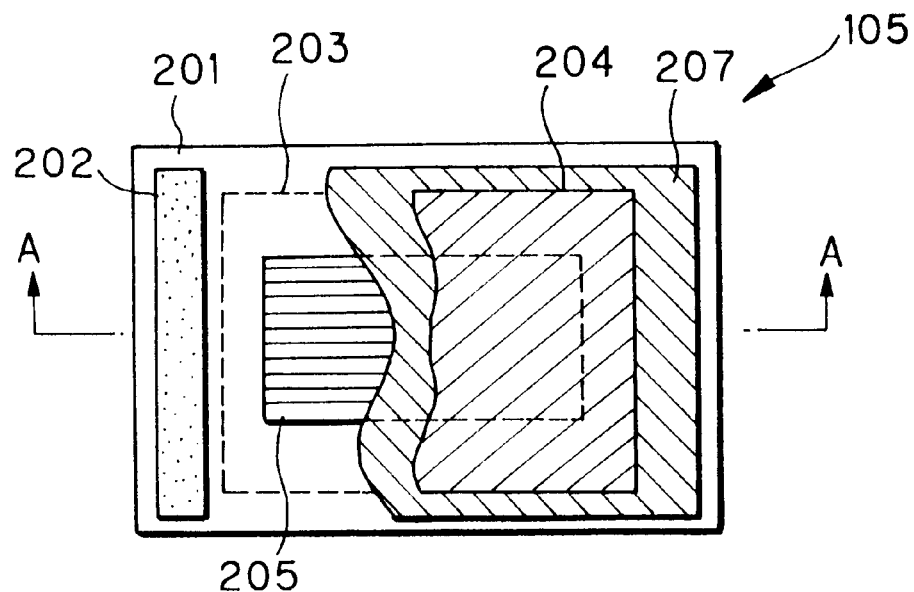
FIG. 6 is a plan view showing the interference type optical shutter in FIG. 4.
Figure 7:
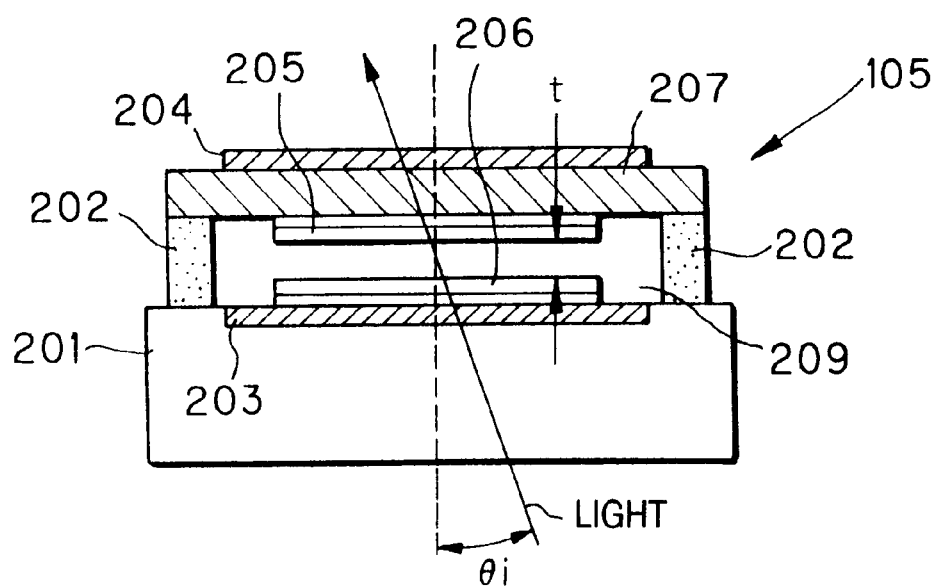
FIG. 7 is a sectional view showing a configuration of the interference optical shutter, taken along a line A—A in FIG. 6.

Concrete examples of the optical modulator device (interference optical shutter) 105 utilizing such Fabry-Perot interference will be explained with reference to FIGS. 6 to 11 hereunder. FIG. 6 is a plan view showing the interference type optical shutter in FIG. 4. FIG. 7 is a sectional view showing a configuration of the interference optical shutter, taken along a line A—A in FIG. 6.

In FIGS. 6 and 7, the interference type optical shutter 105 comprises one electrode 203 arranged to have a predetermined angle relative to the incident light, the other electrode 204 opposed to one electrode 203 to have at least a clearance between them, and a transparent flexible thin film 207 interposed between one electrode 203 and the other electrode 204. The flexible thin film 207 can be bent by a coulomb force generated by applying the voltage between one electrode 203 and the other electrode 204, whereby the light transmitted through the flexible thin film 207 can be modulated to then output.

More particularly, one electrode 203 is constructed to be incorporated into the transparent substrate 201, while a dielectric multi-layered film mirror 205 is provided on the top side of one electrode 203. Struts 202 are provided on the right and left ends of the transparent substrate 201, and the flexible thin film 207 is provided on the top end surfaces of the struts 202. Another dielectric multi-layered film mirror 206 is provided on the back surface of the flexible thin film 207 opposing to the dielectric multi-layered film mirror 205. Accordingly, a clearance 209 is formed between two dielectric multi-layered film mirror 205, 206. In addition, another electrode 204 is provided on the upper surface of the flexible thin film 207 so as to oppose to one electrode 203.

Figure 8A:
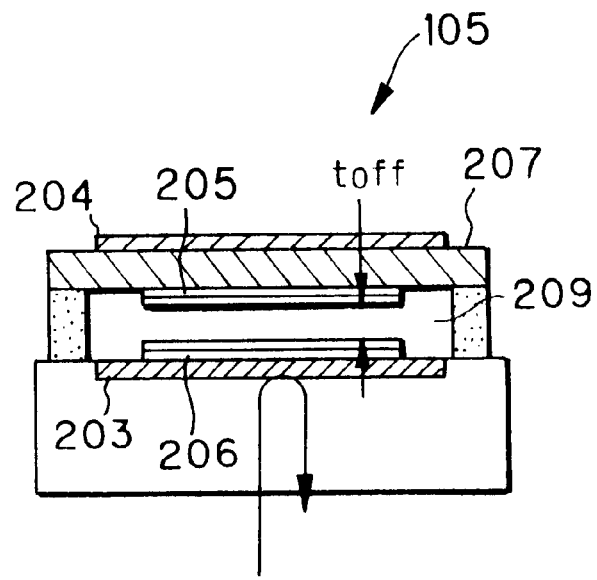
FIGS. 8A and 8B are sectional views showing operational states of the interference type optical shutter in FIG. 6 respectively.
Figure 8B:
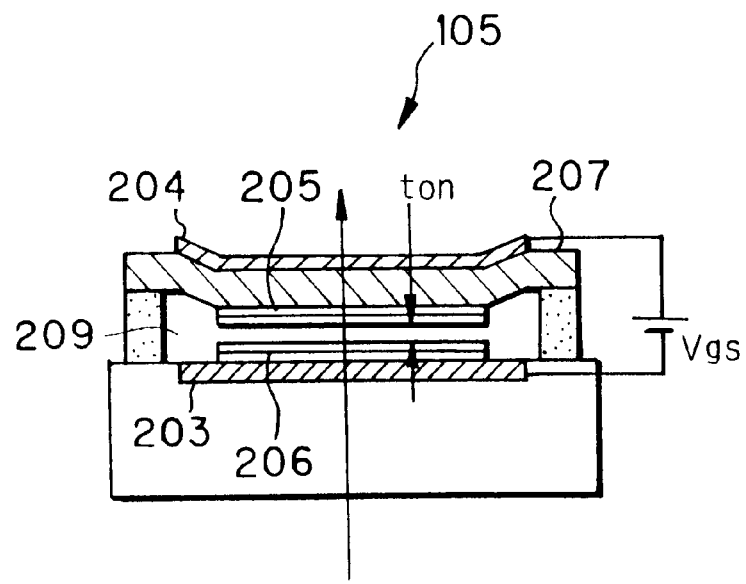
Figure 9:
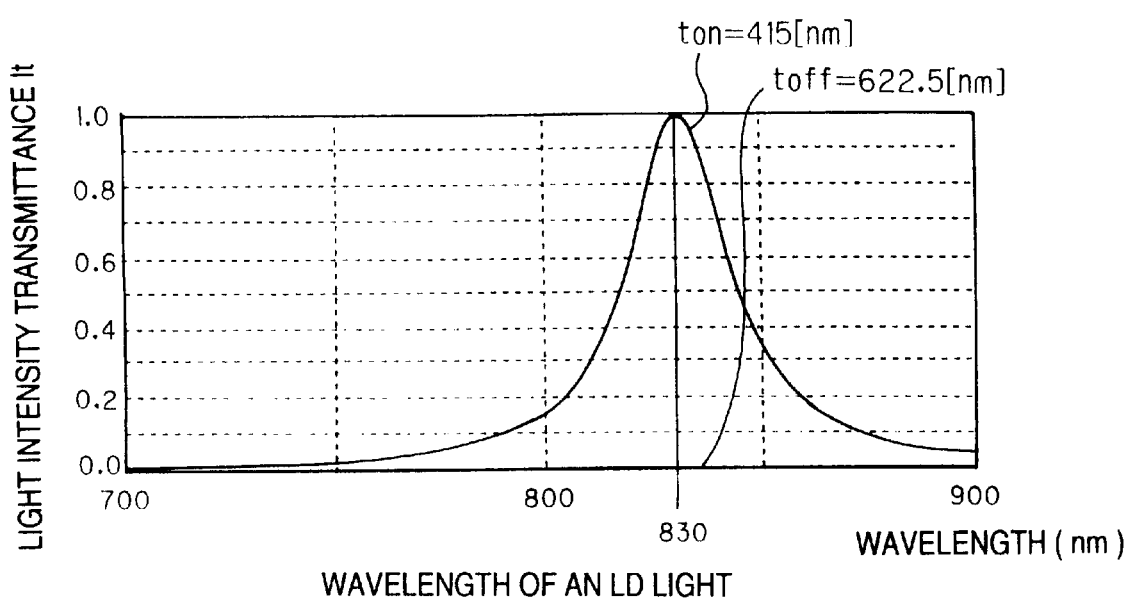
FIGS. 9, 10, 11 are views showing a characteristic of a light intensity transmittance of the interference type optical shutter relative to a wavelength respectively.

According to the interference type optical shutter 105, as shown in the-state in FIG. 8A, when supply of the power supply voltage Vgs between one electrode 203 and the other electrode 204 is turned OFF, the clearance 209 between two dielectric multi-layered film mirror 205, 206 is set to toff. As shown in the state in FIG. 8B, when supply of the power supply voltage Vgs between one electrode 203 and the other electrode 204 is turned ON, the clearance 209 between two dielectric multi-layered film mirror 205, 206 is set to ton. That is, if the power supply voltage Vgs is applied between one electrode 203 and the other electrode 204, the flexible thin film 207 is deformed by the generated coulomb force to narrow an interval of the clearance 209.

In this case, toff can be adjusted at the time of forming the flexible thin film 207, while control of ton can be achieved by the balance between the applied voltage Vgs and the restoring force which is generated when the flexible thin film 207 is deformed. In order to achieve the more stable control, a spacer may be formed between the electrode 203 and the flexible thin film 207 to make a displacement constant. If this spacer is constituted by insulator, an effect to reduce the applied voltage by its relative dielectric constant (more than 1) can be achieved. If this spacer is constituted by conductor, such effect can be increased much more. The one electrode 203, the other electrode 204, and the spacer may be formed by the same material.

As shown in FIG. 7, if an angle between the normal of the surface of the optical shutter and the incident angle is $\theta i$, an light intensity transmittance It of the interference type optical shutter 105 can be given by the following equation. Where R is the light intensity reflectance of the dielectric multi-layered film mirror 205, 206, n is an refractive index of the clearance 209 (n=1 if the clearance 209 is filled with the air), t is an interval of the clearance 209 between the dielectric multi-layered film mirror 205, 206, and $\lambda$ is the wavelength of the light.

It=Here ton and toff are set as follows (m=1).

ton=1/2×$\lambda$=415.0[nm]

toff=3/4×$\lambda$=622.5 [nm]

Also, the light intensity reflectance R of the dielectric multi-layered film mirror 205, 206 is set to R=0.9, the incident angle $\theta i$ is set to $\theta i$=0 [deg], and the refractive index n of the clearance 209 (air or rare gas) is set to n=1. At this time, the characteristic of the light intensity transmittance It of the interference type optical shutter 105 relative to the wavelength can be given as shown in FIG. In other words, the interference type optical shutter 105 does not transmit the light at all if the voltage Vgs is not applied (toff state), while the interference type optical shutter 105 transmits mainly the light of the wavelength 830 [nm] of the semiconductor laser beam if the voltage Vgs is applied (ton state).

As described above, in the interference type optical shutter 105 employed in the first embodiment, since the flexible thin film 207 is deflected by the coulomb force generated when the voltage Vgs is applied between one electrode 203 and the other electrode 204 to generate the multi-layer film interference effect, the light transmitted through the flexible thin film 207 can be optically modulated. If the above interference condition is satisfied, any combination of the interval t of the clearance 209, the refractive index n, the light intensity reflectance R of the dielectric multi-layered film mirror 205, 206, etc. may be employed. If the interval t is changed successively by using the voltage Vgs, it is possible to change freely a center wavelength of the transmission spectrum. As a result, a transmitted light quantity can be successively controlled. That is, gradation control can be achieved by the applied voltage.

Figure 10:
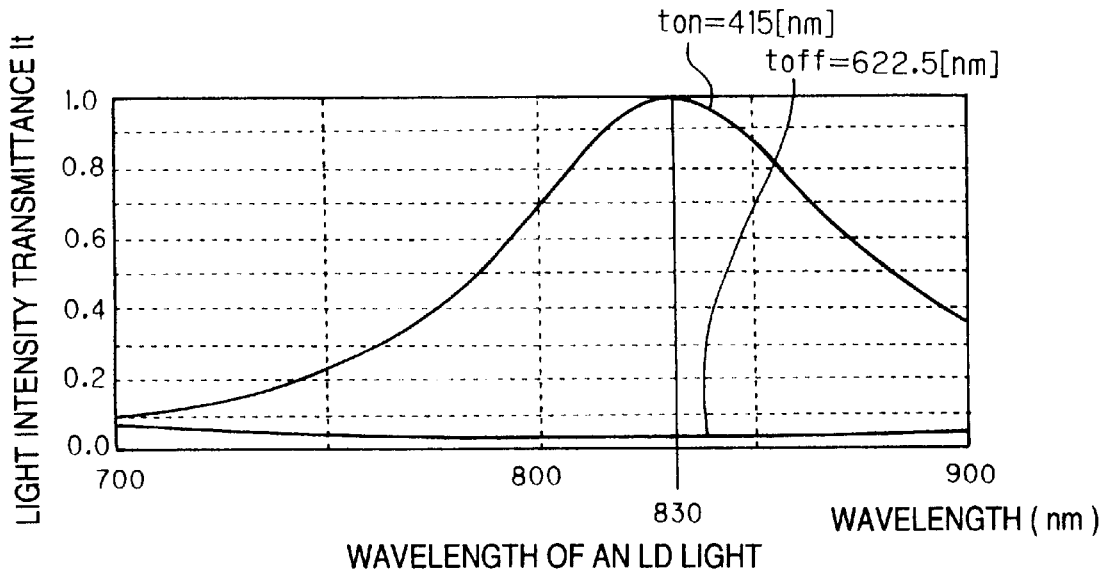

Then, in the event that the light intensity reflectance R of the dielectric multi-layered film mirror 205, 206 is set to 0.7, for example, the result of the characteristic of the light intensity transmittance It of the interference type optical shutter 105 relative to the wavelength is shown in FIG. 10. According to this, a distribution of the characteristic of the light intensity transmittance It becomes broad rather than the characteristic shown in FIG. 9. That is, if the interference type optical shutter 105 having the characteristic shown in FIG. 10 is employed, slight variation in the wavelength of the emitted light of the semiconductor laser 101 is allowed, and thus the low cost semiconductor laser can also be employed. As a result, a production cost of the image recording apparatus can be reduced.

Figure 11:
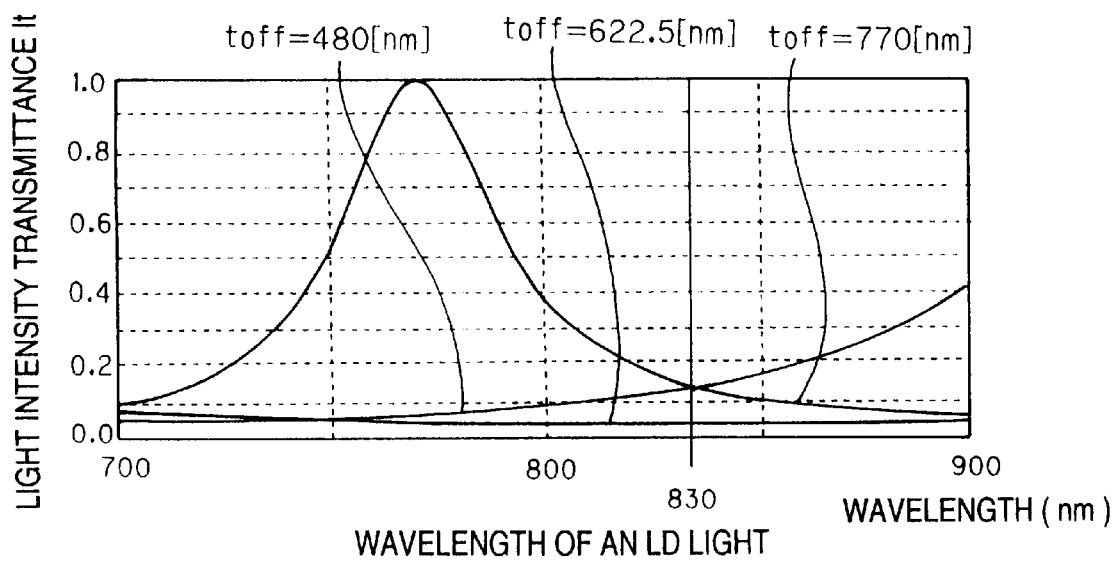

Then, in the event that the interval toff between the dielectric multi-layered film mirror 205, 206 is changed into 480 [nm], 622.5 [nm], and 770 [nm] respectively when supply of the voltage Vgs is turned OFF, respective characteristics of the light intensity transmittance It are shown in FIG. 11. It is understood that, since the light intensity transmittance of the semiconductor laser beam is less than about 15[%] at the wavelength 830 [nm], the range of the interval toff should be 480 [nm]<toff<770 [nm] to reduce the light intensity transmittance to almost less than 0.2 when supply of the voltage Vgs is turned OFF. In the event that the interval ton between the dielectric multi-layered film mirror 205, 206 is changed similarly when supply of the voltage Vgs is turned ON, the range of the interval ton, although not shown, should be 404 [nm]<ton<428 [nm] to increase the light intensity transmittance to almost more than 0.8 when supply of the voltage Vgs is turned ON.

In other words, in order to keep the contrast of more than 4, the light intensity transmittance at the time of ON should be roughly set to more than 0.8 and the light intensity transmittance at the time of OFF should be roughly set to less than 0.2, nevertheless such specification can be satisfied even if the intervals ton and toff are varied as above. In addition, since the interference type optical shutter 105 can be fabricated by the relatively rough film forming operation, the production cost of the image recording apparatus can also be cut down. If the recording medium is composed of density gradation sensitive material, the image can be recorded even when the light intensity transmittance is about 15[%]. However, the image cannot be recorded if the recording medium is composed of binary sensitive material. Rather, such advantage can be achieved that irradiation of the laser beam has a pre-heating effect or an after-heating effect for the neighboring pixels (dots).

The above configuration and the operational principle of the interference type optical shutter are described as an example. Any configuration of the interference type optical shutter will be employed if the light transmittance can be controlled by changing the optical path length difference with the use of the interference effect. The interference type optical shutter 105 is explained as a single device structure, but the interference type optical shutter array may be formed by arranging the interference optical shutters one-dimensionally or two-dimensionally. In the case of the one-dimensional array, the above device structures are aligned in the lateral direction (vertical direction to this sheet) in FIG. 4. In the case of the two-dimensional array, the one-dimensional arrays are aligned in the lateral and vertical directions. In this case, voltage application to respective element electrodes of the array is independently controlled. For example, one electrodes 203 of respective elements are connected to the driver 157 as a common electrode (see FIG. 5) and the other electrodes 204 of respective elements are connected to the driver 157 individually, and then voltage application from the driver 157 to respective elements of the array is controlled individually. In the device in which a plurality of elements are aligned, reflecting material for preventing unnecessary transmission of the light may be provided in clearances between the elements if necessary.

Next, following discussion will be made by comparing the Fabry-Perot interference type optical modulator device by using micromachine drive employed in the first embodiment with the electro-optic crystal device such as the PLZT device, etc. in the prior art.

To begin with, as for the problem of heat generation due to light absorption, PLZT bulk absorption becomes an issue in the PLZT device, etc. because of its long optical path, whereas the problem of heat generation is not caused in the Fabry-Perot interference type optical modulator device since such light absorption is small because of its short optical path.

In the optical shutter utilizing the polarizing device such as PLZT, etc., the polarization degree of the laser beam and positional precision of the polarizing device are important and therefore limitations are imposed on selection of the laser device and optical design. In the Fabry-Perot interference type optical modulator device, no basic limitation is imposed on the polarization property and therefore the margin in design can be improved.

As for the high speed responsibility, about 1 [μs] or less can be achieved in the electro-optic crystal device, whereas the range of several tens [ns] to several [μs] can be achieved in the Fabry-Perot interference type optical modulator device if shapes and material (especially, elastic constant) of the flexible thin films are selected appropriately and an overlapping area between the opposing transparent electrodes is increased and also the distance between the transparent electrodes is made as small as possible. For example, when the light of 1 [μs] is emitted to record one pixel, the high-speed responsible device such as about 100 to 300 [ns] can be employed. In other words, according to the Fabry-Perot interference type optical modulator device, a device having higher-speed responsibility can be achieved.

As for the driving voltage, about 40 [V] is needed in the electro-optic crystal device, whereas merely about 10 [V] is needed in the Fabry-Perot interference type optical modulator device by optimizing the device configuration as above since an electrostatic force is utilized. Then, the integration of the circuit is difficult in the electro-optic crystal device because the PLZT substrate is employed, whereas the integration of the circuit is easily made in the course of processes of the silicon substrate, etc. in the Fabry-Perot interference type optical modulator device. For instance, the silicon substrate may be used in place of the transparent substrate (e.g., glass substrate) explained in above FIGS. 6 to 8. In this case, since the optical transmittance at the wavelength of 830 [nm], for example, is low, the transparent optical shutter region should be adopted. In detail, the silicon oxide film is formed on the surface of the silicon substrate on the flexible thin film forming side, and then only the transparent silicon oxide film is left in the optical shutter region by removing only the silicon substrate in this optical shutter region by virtue of etching. In this case, circuits are formed on the not-etched region of the silicon substrate.

In this manner, the Fabry-Perot interference type optical modulator device has useful characteristics which cannot be achieved by using the electro-optic crystal device.

Next, an operation of the image recording apparatus according to the first embodiment will be explained hereunder. In recording the image onto the recording medium 3, the image data are previously input into the controller 151 from the external device. Such image data are data representing the density of respective pixels constituting the image based on the binary logic (i.e., the dot is recorded or not). The controller 151 stores input image data once in the frame memory 153. In case the image is recorded actually onto the recording medium 3, the controller 151 renders the recording rotating drum 2 to rotate at a predetermined velocity, turns on the semiconductor laser 101 and then controls the semiconductor laser 101 such that the power of the laser beam emitted from the semiconductor laser 101 can be kept at a predetermined value, and controls the temperature of the semiconductor laser 101 at a predetermined temperature.

In parallel with the above control, the controller 151 reads the image data stored in the frame memory 153 sequentially in unit of pixels, which are substantially equal in number to the electrodes 204 provided to the interference type optical shutter array (one-dimensional array is assumed) 105, in compliance with the sequence of the images recorded by the optical head 1 onto the recording medium 3. Then, the controller 151 applies the voltage selectively between the common electrode 203 and a number of electrodes 204 of the interference type optical shutter array 105 via the driver 157 respectively in response to the density value (binary value) of respective pixels representing the read image data. The above operations are repeated successively thereafter.

Accordingly, the recording laser beam is emitted from the optical head 1 and irradiated onto the recording medium 3, and then a large number of lines of the image are recorded simultaneously along the main scanning direction with the rotation of the recording rotating drum 2. After one main scanning operation has been completed, the controller 151 shifts the moving stage 4 and the optical head 1 to their initial positions. Then, the sub scanning operation of the recording laser beam is performed according to this operation, and then the images can be recorded onto the recording medium 3 by repeating the sub scanning operation.

As described above, in the image recording apparatus according to the first embodiment, the laser beam emitted from the high output semiconductor laser 101 is irradiated to the interference type optical shutter 105 via the first optical system 103 as the laser beam which is formed wide in a predetermined direction being intersected with the emitted direction of the laser beam. The controller 151 applies selectively the voltage to respective electrode pairs of the interference type optical shutter 105 in response to the image to be recorded onto the recording medium 3, and then optically modulates the laser beam, which is irradiated into the interference type optical shutter 105, by using the electromechanical operation of the flexible thin film 207. Accordingly, after passed through the interference type optical shutter 105, the laser beam is irradiated onto the recording medium 3 via the second optical system 107.

In this fashion, with the use of the interference optical shutter, the image recording apparatus with high reliability can be implemented, which can be operated by the lower voltage to have the excellent high-speed responsibility without the problem of heat generation due to the light absorption, can be formed as the integrated circuit on the semiconductor substrate, and can also execute the high-speed image recording onto the low sensitivity recording medium in the heat mode.

As described above, the interference type optical shutter 105 reflects the laser beam not to transmit at the OFF time when the voltage is not applied between one electrode 203 and the other electrode 204 in the interference type optical shutter 105. In this case, if such an event happens that the reflected light, i.e., the return light from the interference type optical shutter 105 inputs into the semiconductor laser 101, a complex resonator is formed in the semiconductor laser 101 to thus make the characteristics unstable.

Therefore, in second to fifth embodiments described in the following, the image recording apparatus is constructed not to input surely the return light from the interference type optical shutter 105 into the semiconductor laser.

Figure 12:
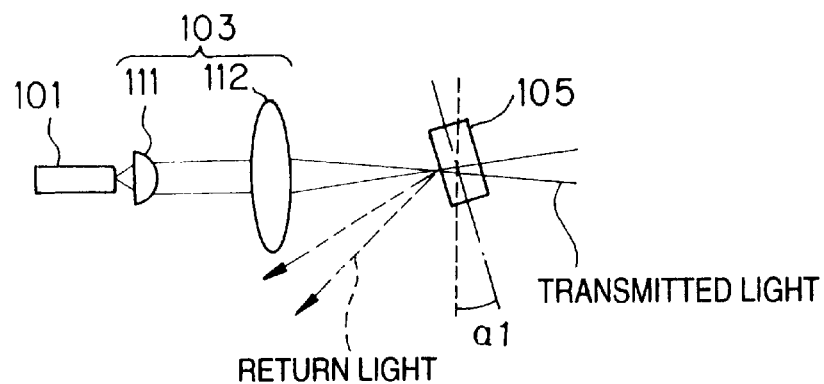
FIG. 12 is a view showing a pertinent configuration of an optical system of an optical head in the image recording apparatus according to a second embodiment of the present invention.

First, a second embodiment of the present invention will be explained hereunder. A pertinent configuration of an optical system of an optical head in the image recording apparatus according to the second embodiment is shown in FIG. 12. In this second embodiment, in order to eliminate the influence of the above return light, a shutter surface of the interference type optical shutter 105 is arranged to be inclined relative to a surface, which intersects orthogonally with the incident optical axis of the laser beam from the first optical system 103, by a predetermined angle α1 such that the return light from the interference type optical shutter 105 does not enter into the first optical system 103 (the first lens 111 and the second lens 112).

As a result, the return light from the interference type optical shutter 105 is not input into the first optical system 103 at all, and therefore the laser beam can be prevented from returning to the semiconductor laser 101.

Figure 13:
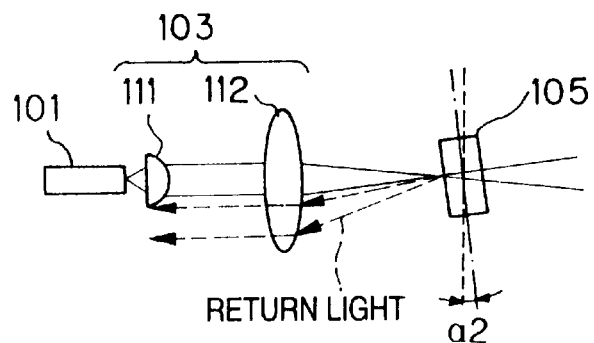
FIG. 13 is a view showing a pertinent configuration of an optical system of an optical head in the image recording apparatus according to a third embodiment of the present invention.

Then, a third embodiment of the present invention will be explained hereunder. A pertinent configuration of the optical system of the optical head in the image recording apparatus according to the third embodiment is shown in FIG. 13. In this third embodiment, the interference type optical shutter 105 is arranged to be inclined relative to a surface, which intersects orthogonally with the incident optical axis of the laser beam from the first optical system 103, by a predetermined angle α2, which is smaller than the above angle α1, such that the return light from the interference type optical shutter 105 can be input into the second lens 112 but not input into the first lens 111.

Accordingly, the image recording apparatus is constructed to prevent entering of the return light from the interference type optical shutter 105 into the semiconductor laser 101 but allow entering of the return light into the second lens 112 of the first optical system 103 only. As a result, the inclined angle α2 of the interference type optical shutter 105 can be set smaller than the above angle α1 and therefore reduction in the optical modulation efficiency can be suppressed.

Figure 14:
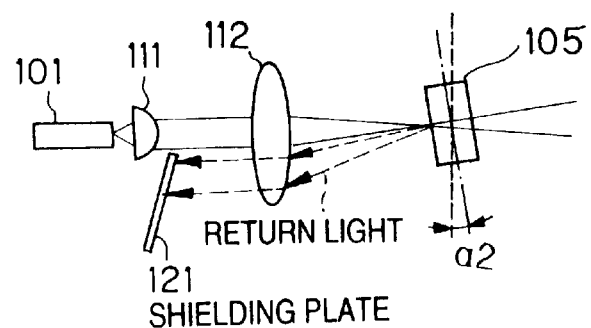
FIG. 14 is a view showing a pertinent configuration of an optical system of an optical head in the image recording apparatus according to a fourth embodiment of the present invention.

Next, a fourth embodiment of the present invention will be explained hereunder. A pertinent configuration of the optical system of the optical head in the image recording apparatus according to the fourth embodiment is shown in FIG. 14. In this fourth embodiment, a shielding plate 121 is arranged in the neighborhood of the first lens 111 in the middle of the optical path of the return light such that the return light from the interference type optical shutter 105 does not enter into the semiconductor laser 101.

As a result, the inclined angle a2 of the interference type optical shutter 105 can be reduced and thus reduction in the optical modulation efficiency can be suppressed. In addition, entering of the return light to the semiconductor laser 101 can be prevented more surely and thus the influence due to the return light can be eliminated.

Figure 15:
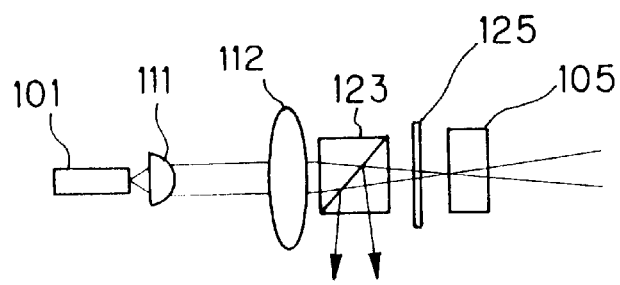
FIG. 15 is a view showing a pertinent configuration of an optical system of an optical head in the image recording apparatus according to a fifth embodiment of the present invention.

Next, a fifth embodiment of the present invention will be explained hereunder. A pertinent configuration of the optical system of the optical head in the image recording apparatus according to the fifth embodiment is shown in FIG. 15. In this fifth embodiment, a polarizing beam splitter 123 and a λ/4 wavelength plate 125 are arranged between the second lens 112 and the interference type optical shutter 105.

The polarization state will be explained hereunder. It is assumed that the polarizing beam splitter 123 is set to transmit the laser beam whose polarization direction is the vertical direction and refract the laser beam whose polarization direction is the lateral direction, and thus the laser beam whose polarization direction is the vertical direction is emitted from the semiconductor laser 101.

When the laser beam whose polarization direction is the vertical direction is transmitted through the first lens 111, the second lens 112 and the polarizing beam splitter 123 to input into the λ/4 wavelength plate 125, such laser beam whose polarization direction is the vertical direction is circularly polarized (45° polarized) by the λ/4 wavelength plate 125 and then output to the interference type optical shutter 105.

Then, the circularly polarized (45° polarized) laser beam is output to the second optical system 107 when the interference type optical shutter 105 is in the transmission mode, but the circularly polarized (45° polarized) laser beam is input into the λ/4 wavelength plate 125 again as the return light when the interference type optical shutter 105 is in the non-transmission mode. Then, the polarization direction of the return light is changed to the lateral direction by the λ/4 wavelength plate 125, and then the return light is input into the polarizing beam splitter 123. Since the laser light whose polarization direction is the lateral direction is refracted by the polarizing beam splitter 123, such laser light is departed from the incident optical axis.

Accordingly, the optical modulation efficiency is never reduced because there is no need to place the interference type optical shutter 105 at an angle, and the return light from the interference type optical shutter 105 to the semiconductor laser 101 can be removed without fail and therefore the influence of the return light can be eliminated firmly.

Figure 16:
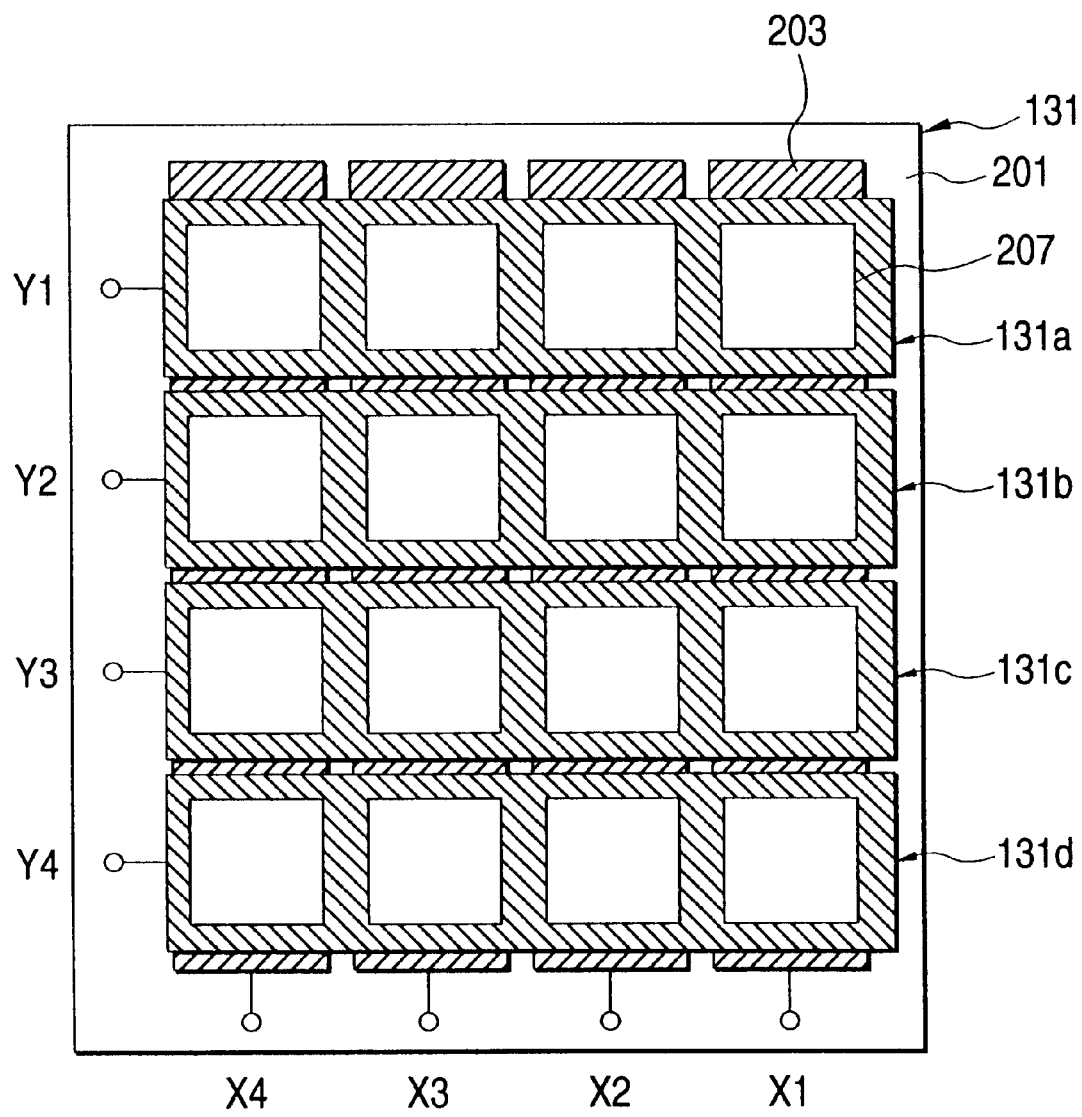
FIG. 16 is a view showing a configuration of an optical modulation array device employed in the image recording apparatus according to a sixth embodiment of the present invention.

Next, an image recording apparatus according to a sixth embodiment of the present invention will be explained hereunder. FIG. 16 is a plan view showing an interference type optical shutter array employed in the sixth embodiment.

In the image recording apparatus according to the sixth embodiment, a transmission type optical modulator device is formed as a two-dimensional interference type optical shutter array 131 in which a plurality of interference type optical shutters are arranged two-dimensionally. In the illustrated example, a plurality of interference type optical shutters are arranged in the sub scanning direction (the width direction of the recording rotating drum 2) and the main scanning direction in a matrix fashion.

Electrodes Y1, Y2, Y3, Y4 are connected to the electrode films 207 of the interference type optical shutter, which are aligned in the main scanning direction. Electrodes X1, X2, X3, X4 are connected to the substrate side electrodes 203 of the interference type optical shutter, which are aligned in the sub scanning direction. Hence, if any of the electrodes Y1, Y2, Y3, Y4 and any of the electrodes X1, X2, X3, X4 are selected and then the voltage is applied to it, desired elements of the interference type optical shutter, which are aligned in a matrix fashion, can be driven.

In the interference type optical shutter array 131, irradiation lights can be input simultaneously into respective rows of the optical modulator portions 131a, 131b, 131c, 131d, which are constituted by the interference type optical shutters arranged in a matrix fashion. That is, it is possible to perform the optical modulation at plural rows simultaneously.

According to the image recording apparatus of the sixth embodiment of the present invention, the processing speed along the main scanning direction can be accelerated more quickly by the number of rows than the one-dimensional optical modulation array device where the interference type optical shutters of the same number are aligned.

Figure 17:
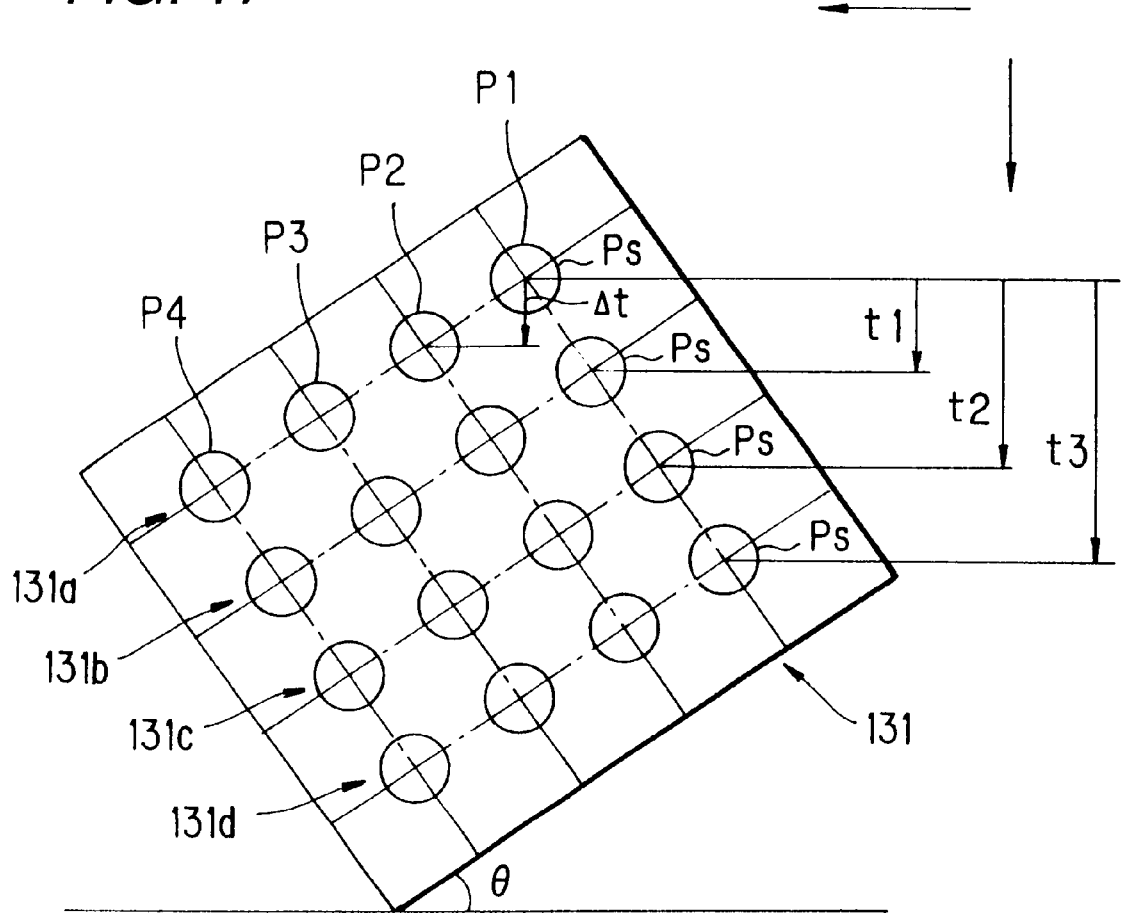
FIG. 17 is a view showing a configuration of an optical modulation array device employed in the image recording apparatus according to a seventh embodiment of the present invention.

Next, an image recording apparatus according to a seventh embodiment of the present invention will be explained hereunder. FIG. 17 is a plan view showing an interference type optical shutter array employed in the seventh embodiment. In the image recording apparatus according to the seventh embodiment, like the above sixth embodiment, the interference type optical shutter array is formed as the two-dimensional interference type optical shutter array 131 in which a plurality of interference type optical shutters are arranged two-dimensionally. In addition, in the seventh embodiment, the two-dimensional interference type optical shutter array 131 is rotated around a normal of the reflection/diffraction surface only by a predetermined angle θ.

In the seventh embodiment, a configuration will be explained as an example wherein the optical modulation elements (interference type optical shutters) are aligned four by four along the main scanning direction and the sub scanning direction respectively.

Since the optical modulator portions 131a, 131b, 131c, 131d, which are arranged one-dimensionally in respective rows, are rotated by a predetermined angle θ relative to the horizontal direction, irradiation points P1, P2, P3, P4 of individual interference type optical shutters in the optical modulator portions are shifted in both the main scanning direction and the sub scanning direction. In addition, irradiation starting points Ps in respective optical modulator portions 131a, 131b, 131c, 131d are also shifted in both the main scanning direction and the sub scanning direction.

Figure 18:
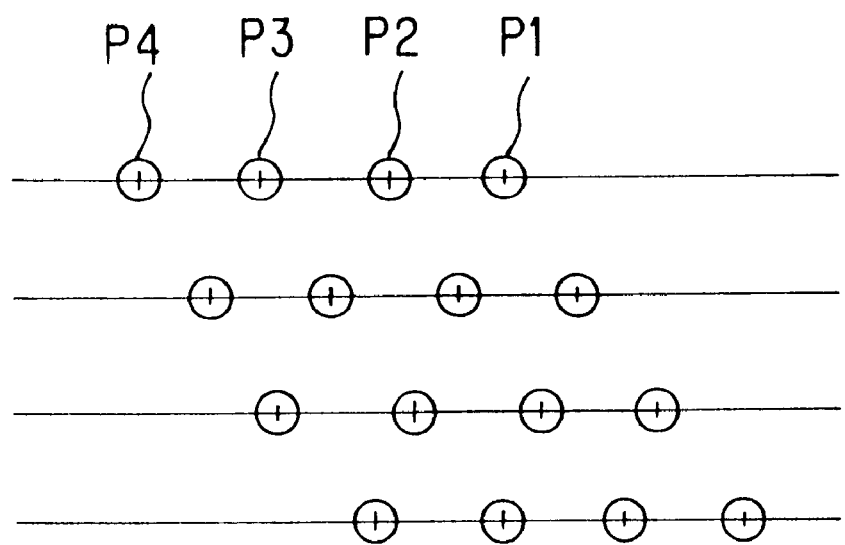
FIG. 18 is a view illustrating a recording state of the optical modulation array device in FIG. 17.

Therefore, as shown in FIG. 18, if the recording signals are delayed by Δt minute which is decided with regard to the peripheral velocity of the recording rotating drum 2, i.e., the main scanning speed and the discrete distances between the irradiation points, the irradiation points P1, P2, P3, P4 of the optical modulator portions 131a, 131b, 131c, 131d are recorded on the straight lines along the sub scanning direction as many as the number of the optical modulation array elements. This delay information are set previously in the LUT (look up table). The signals are delayed by referring to the LUT appropriately in recording.

Figure 19:
FIG. 19 is a view illustrating spot intervals which are recorded finally by the optical modulation array device in FIG. 17.

Further, as shown in FIG. 19, if the irradiation starting points Ps in respective optical modulator portions 131b, 131c, 131d are delayed by t1, t2, t3 minutes which are decided with regard to the main scanning speed and the discrete distances between the irradiation starting points Ps, image recordings are carried out by respective optical modulator portions 131a, 131b, 131c, 131d on one straight line respectively, so that high density recording can be attained.

In this case, the irradiation points may be delayed individually by considering the discrete distance of the irradiation points in the main scanning direction respectively.

According to the image recording apparatus of the seventh embodiment, distances between the irradiation points P1, P2, P3, P4 effected by the interference type optical shutters in the sub scanning direction can be substantially narrowed by rotating the interference type optical shutter array 131 by the predetermined angle θ. As a result, fine linear images with excellent linearity can be achieved.

The rotation angle θ depends on a matrix distance of the interference type optical shutter array 131. It is preferable that the rotation angle θ should be set such that, when all the irradiation points are superposed on the straight line (in the state shown in FIG. 19), the discrete distances between the irradiation points are made equal as much as possible.

Figure 20:
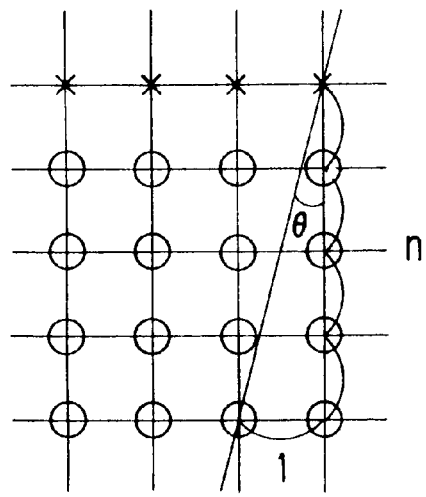
FIG. 20 is a view showing a behavior for recording the image by using overall channels in which 4×4 irradiation points are arranged in equal pitch.
Figure 21:
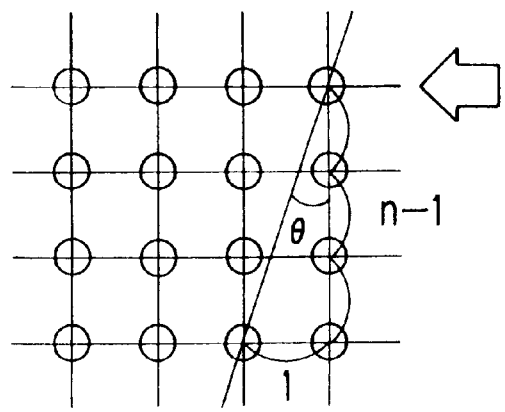
FIG. 21 is a view showing a behavior for recording the image by using the channels in which 4×4 irradiation points are arranged in equal pitch except for one row.
Figure 22:
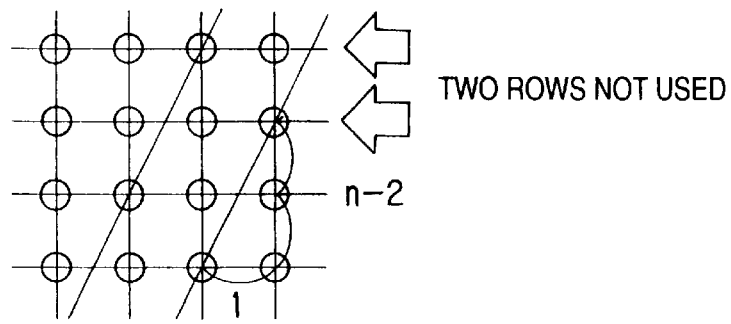
FIG. 22 is a view showing a behavior for recording the image by using the channels in which 4×4 irradiation points are arranged in equal pitch except for two rows.

As shown in FIG. 20, the case where irradiation points are arranged 4×4 in equal pitch will be considered. If a relationship between the number n of the rows of the irradiation points and the rotation angle θ is set to $$\tan\theta = 1/N,$$

the images are recorded by using overall channels of the irradiation points. As shown in FIG. 21, if such relationship is set to $$\tan\theta = 1/(n-1),$$

the irradiation points which are overlapped with each other on the first row and the fourth row are caused. In this case, output of the write signal for either of two lines (e.g., the first line) is stopped in recording. That is, the image recording is performed without using one line. Next, as shown in FIG. 22, if such relationship is set to $$\tan\theta = 1/(n-2),$$

the irradiation points which are overlapped with each other on the first row and the third row and the second row and the fourth row respectively are caused. In this case, for example, the image recording is performed without using the first row and the second row.

Figure 23:
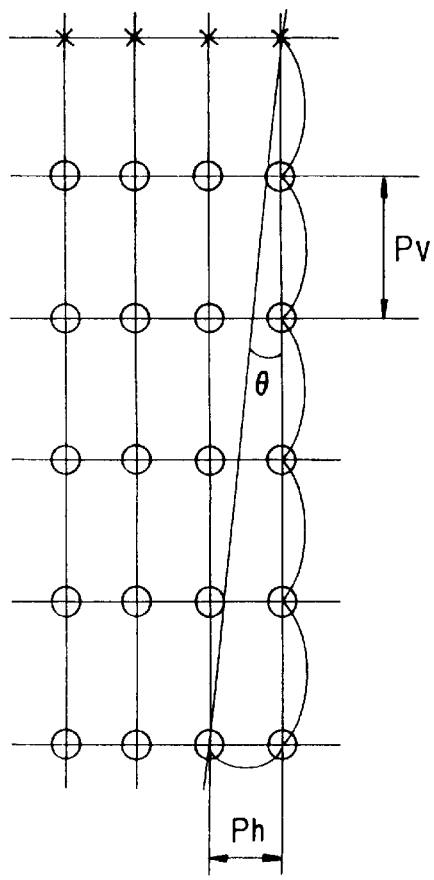
FIG. 23 is a view showing the optical shutter array if the 5×4 irradiation points are arranged in different main and sub pitches respectively.

Meanwhile, as shown in FIG. 23, if the 5×4 irradiation points are arranged along the main and sub scanning directions in different pitches respectively, the relationship between the number n of the rows of the irradiation points and the rotation angle θ can be given by $$\tan\theta = Ph/(n \times Pv).$$

Where Ph and Pv are a horizontal pitch and a vertical pitch of the irradiation point array respectively.

Next, an eighth embodiment of the present invention will be explained hereunder.

Figure 24:
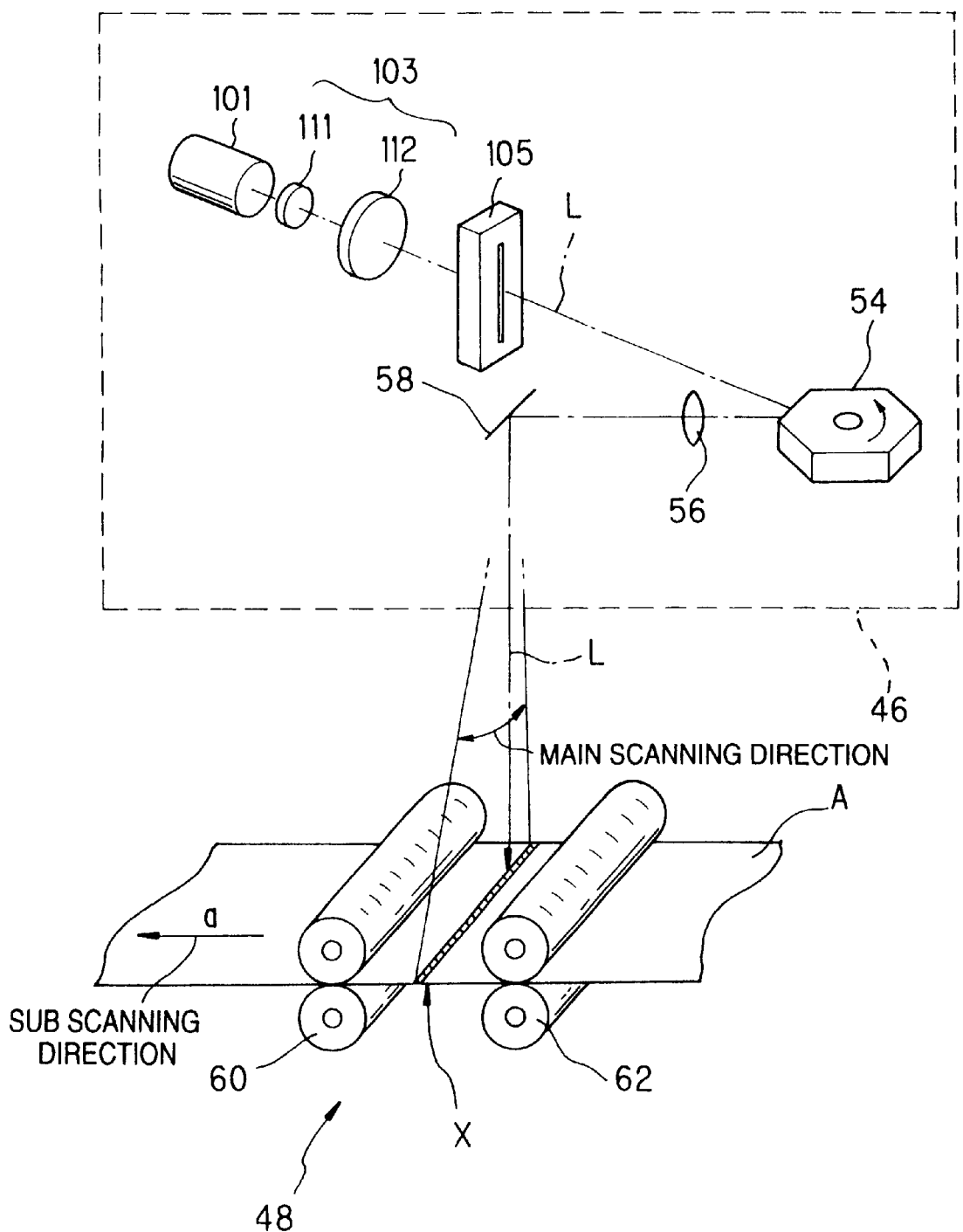
FIG. 24 is a perspective view showing a pertinent configuration of an image recording apparatus according to an eighth embodiment of the present invention.

In the foregoing embodiments, the optical head on which the light source is mounted is moved relatively with respect to the recording rotating drum on which the recording medium is fitted. In contrast, in this eighth embodiment, as shown in FIG. 24, the image recording apparatus is constructed to comprise an exposure unit 46 for transmitting the light emitted from the light source 101, and a sub scanning carrying means 48 for irradiating the light from the exposure unit 46 onto the recording medium and carrying the recording medium in the sub scanning direction. In this case, like symbols are affixed to the same members as those in the above embodiments and therefore redundant explanation will be omitted.

The exposure unit 46 is the well known light beam scanning unit which deflects the light beam L, which is modulated in response to the recording image shown in FIG. 24, in the main scanning direction (in this case, the width direction of the recording material A unlike the above embodiments) to input into a predetermined recording position X. The exposure unit 46 comprises a light source 101 for emitting the light beam L of the narrow wavelength bandwidth in answer to the spectral sensitivity characteristic of the recording material A, the first lens (cylindrical lens) 111 and the second lens 112, a ploygon mirror 54 serving as the optical polarizer, an fθ lens 56, and a turning-down mirror 58.

In addition to the above members, various members which are arranged in the well known optical beam scanning unit, e.g., the collimeter lens for shaping the light beam L emitted from the light source, the beam expander, the deformed-plane correction optical system, the optical path adjusting mirror, etc. can be provided to the exposure unit 46 as the case may be.

In this case, either thermal development recording material or photosensitive/thermosensitive recording material may be listed as the recording material.

The thermal development recording material is recording material which records (exposes) the images by the light beam such as at least one laser beam and then develops colors by the thermal development.

The photosensitive/thermosensitive recording material is recording material which records (exposes) the images by the light beam such as at least one laser beam and then develops colors by the thermal development, otherwise records the images by the laser beam in the heat mode (heat) and simultaneously develops the colors, and then fixes them by the light irradiation. These thermal development recording material and the photosensitive/thermosensitive recording material will be explained in more detail later.

The light beam L emitted from the light source 101 is deflected by the polygon mirror 54 via the interference type optical shutter 105 in the main scanning direction, then dimmed by the fθ lens 56 so as to form the images at the recording position X, and then deflected by the turning-down mirror 58 to input into the recording position X.

In the illustrated example, the exposure unit 46 has only one light source 101 in the monochrome image recording apparatus. But, upon recording the color images, the exposure unit which has three light sources for emitting the light beams in response to the spectral sensitivity characteristics of R(red), G(green), B(blue) of the color photosensitive material, for example, is employed.

Then, the sub scanning carrying means 48 has a pair of carrying rollers 60, 62 placed to put the recording position X (scanning line) between them. While holding the recording material A at the recording position X, the carrying rollers 60, 62 carries the recording material A along the sub scanning direction (the direction indicated by an arrow a in FIG. 24) which orthogonally intersects with the main scanning direction.

Since the light beam L which is subjected to the pulse-width modulation in response to the recording images as described above, the recording material A is scanned and exposed two-dimensionally by the light beam and thus latent images are formed.

In the illustrated example, the configuration in which the pulse-width modulation is carried out by directly modulating the light source 101 is employed. However, the pulse-number modulation unit may also be utilized other than the above. If the pulse-width modulation can be carried out, the indirect modulation unit using the external modulator such as AOM (acousto-optic modulator), etc. may also be utilized. In addition, the image may be recorded by using the analogue modulation.

In this case, the light source 101 is composed of the broad area laser light source and the linear array type light source in which a plurality of light emitting blocks having light emitting surfaces (or light emitting spots) are linearly aligned. In the interference type optical shutter 105, the alignment direction of individual optical modulation elements coincide with the alignment direction of the light emitting blocks of the light source 110. Also, this direction substantially coincides with the direction which intersects orthogonally with the main scanning direction of the recording medium A.

According to this configuration, the transmitted light from the interference type optical shutter 105 is scanned on the recording medium A by rotating the polygon mirror 54 in the main scanning direction, and the interference type optical shutter 105 is ON/OFF-controlled, and at the same time the recording medium A is carried by the sub scanning carrying means 48. As a result, the image can be recorded onto the recording medium A.

At this time, like the case shown in FIG. 17, the high density recording can be achieved by rotating the unit including the light source 101 and the interference type optical shutter 105 by a predetermined angle from the direction, which intersects orthogonally with the carrying direction (sub scanning direction) of the recording medium A.

Next, the recording medium A will be explained in detail in the following.

Normally, followings systems may be listed as an example of the dry developing system respectively.

(1) The system in which the images can be transferred onto the image receiving material by superposing the photosensitive material, which is exposed like the image, and the image receiving material and then heating them (and applying the pressure if necessary) so as to mate with the latent images formed on the photosensitive material by the exposure (for example, such system is set forth in Patent Application Publication (KOKAI) Hei 5-113629, Patent Application Publication (KOKAI) Hei 9-258404, Patent Application Publication (KOKAI) Hei 9-61978, Patent Application Publication (KOKAI) Hei 9-61978, Patent Application Publication (KOKAI) Hei 8-62803, Patent Application Publication (KOKAI) Hei 10-71740, Patent Application Publication (KOKAI) Hei 9-152705, Patent Application Publication (KOKAI) Hei 10-90181, Patent Application Publication (KOKAI) Hei 10-13326, and Patent Application Publication (KOKAI) Hei 10-18172). The recording material of this system corresponds to the recording medium 3 shown in the first to seventh embodiments.

(2) The system in which the images can be formed onto the photosensitive material by superposing the photosensitive material, which is exposed like the image, and the processing material and then heating them so as to mate with the latent images formed on the photosensitive material by the exposure (for example, such system is set forth in Patent Application Publication (KOKAI) Hei 9-274295, Patent Application Publication (KOKAI) Hei 10-17192, etc.)

(3) The system in which the latent images formed by the exposure are changed into the visible images by exposing the photosensitive material having the photosensitive layer, in which silver halide acting as the optical catalyst, silver salt acting as the image forming material, reducing agent for silver ion, etc. are dispersed into the binder, like the images and then heating the photosensitive material at a predetermined temperature (for example, such system is set forth in "Thermally Processed Silver Systems", B. Shely, Imaging Processes and Materials, Neblette version 8, edited by V. Walworth, A. Shepp, p.2, 1996, Research Disclosure 17029 (1978), EP803764A1, EP803765A1, and Patent Application Publication (KOKAI) Hei 8-211521.)

(4) The system in which the photosensitive/thermosensitive recording material is employed. More particularly, the system in which such photosensitive/thermosensitive recording layer utilizes the recording material which contains the electron-releasing achromatic dye included in the microcapsule, and the compound, which includes the electron acceptor portion and the polymerization vinyl monomer portion in the same molecule, and the photopolymerization initiator on the outside of the microcapsule (for example, such system is set forth in Patent Application Publication (KOKAI) Hei 4-249251, etc.), or the system in which such photosensitive/thermosensitive recording layer utilizes the recording material which contains the electron-releasing achromatic dye included in the thermally responsible microcapsule, and the electron acceptive compound, the polymerization vinyl monomer, and the photopolymerization initiator on the outside of the microcapsule (for example, such system is set forth in Patent Application Publication (KOKAI) Hei 4-211252, etc.).

In this disclosure, the "thermal development photosensitive material" is a general term for these photosensitive material and the recording material employed in these dry developing system.

As described above, according to the image recording apparatus, the laser beam emitted from the light source is irradiated into the transmission type optical modulator device (the interference type optical shutter) which can withstand the high power laser beam and also the voltage which mates with the images to be recorded on the recording medium is selectively applied to the electrode pairs of the optical modulator device, thus the laser beam being input into the optical modulator device is optically modulated by the electromechanical operation of the thin film to thus irradiate onto the recording medium, whereby the optical modulation can be achieved. As a result, the image recording apparatus with high reliability, which can record the images onto the recording medium in the heat mode at high speed, can be provided Further, the optical modulator device can modulate the light transmitted through the flexible thin film, by deflecting the flexible thin film, which is interposed between one electrode and the other electrode, by virtue of the coulomb force, which is generated by applying the voltage between one electrode and the other electrode. In this case, for example, by using the optical modulator device utilizing the Fabry-Perot interference, the image recording apparatus with high reliability can be implemented, which can be operated by the lower voltage to have the excellent high-speed responsibility without the problem of heat generation due to the light absorption, can be formed as the integrated circuit on the semiconductor substrate, and can also execute the high-speed image recording onto the low sensitivity recording medium in the heat mode.

Furthermore, the return light from the optical modulator device can be prevented from entering into the light source by tilting the optical modulator device relative to the surface being intersecting orthogonally with the incident optical axis from the light source by the predetermined angle or by arranging the shielding plate or the polarizing beam splitter and the wavelength plate such that the return light from the optical modulator device is not input into a part or all of the incident light paths. As a result, the influence of the return light on the light source characteristic can be eliminated and thus reliability of the image recording apparatus in operation can be improved much more.

The distances between the irradiation points by the optical modulator device in the width direction of the recording medium can be substantially narrowed by arranging the optical modulator device array such that the alignment direction of the optical modulation elements are rotated relative to the axis direction of the recording rotating drum by the predetermined angle. As a result, the fine linear images with excellent linearity can be achieved.

What is claimed is:

1. An image recording apparatus for recording an image on an image recording sheet, the image recording apparatus comprising:

a light source for emitting a laser light, wherein said light source has an output power of at least 2 Watts; and a Fabry-Perot interference transmission type optical modulator device integrated in a silicon substrate forming the image recording apparatus, wherein said Fabry-Perot interference transmission type optical modulator device optically modulates the laser light emitted from the light source by an optical interference effect based on an electromechanical operation of a flexible thin film to record the image on the image recording sheet.

2. An image recording apparatus according to claim 1, wherein the optical modulator device comprises:

a first electrode;

a second electrode facing the first electrode to put a clearance between them, and a flexible thin film connected to any one of the first and second electrodes, and deflects the flexible thin film by a coulomb force, which is generated by applying a voltage between the first and second electrodes, to then modulate the light transmitted through the flexible thin film by an optical multi-layer film interference effect.

3. An image recording apparatus according to claim 1, wherein the optical modulator device is arranged to be inclined relative to a surface, which intersects orthogonally with an incident optical axis from the light source, by a predetermined angle.

4. An image recording apparatus according to claim 1, wherein a shielding plate is interposed in a middle of an optical path of a return light from the optical modulator device such that the return light is prevented from entering into the light source by the shielding plate.

5. An image recording apparatus according to claim 1, wherein a polarizing beam splitter and a wavelength plate are provided between the light source and the optical modulator device, polarization directions of an incident light and a return light are changed differently respectively, and thus only the return light is removed from an incident optical axis by the polarizing beam splitter.

6. An image recording apparatus according to claim 1, wherein the light source comprises a laser light source, and the optical modulator device comprises an optical modulator device array in which a plurality of optical modulator elements are aligned in a one-dimensional fashion.

7. An image recording apparatus according to claim 6, wherein an alignment direction of the optical modulator elements coincides substantially with a direction which intersects orthogonally with a main scanning direction.

8. An image recording apparatus according to claim 6, wherein the optical modulator device array is arranged to have a direction which is rotated around a normal of a surface intersecting orthogonally with an incident optical axis from the light source by a predetermined angle $\theta$.

9. An image recording apparatus according to claim 8, wherein the optical modulator device is an optical modulator array device whose elements are aligned in a two-dimensional matrix, and the predetermined angle $\theta$ can be expressed by $\tan \theta = Ph/(n \times Pv)$ where n is number of rows in a main scanning direction of irradiation points which correspond to optical modulator elements, Ph is a pitch in the main scanning direction, and Pv is a pitch in a sub scanning direction.

10. An image recording apparatus according to claim 1, wherein the optical modulator device is arranged to be inclined relative to a surface, which intersects orthogonally with an incident optical axis from the light source by an angle so as to prevent the return light from the optical modulator device from reaching to the light source.

11. An image recording apparatus according to claim 1, wherein said Fabry-Perot interference transmission type optical modulator device includes a second flexible thin film made of silicon oxide film.

12. An image recording apparatus according to claim 11, wherein said second flexible thin film made of the silicon oxide film is left in the optical shutter region by removing only the silicon substrate in an optical shutter region by etching.

* * * * *